(12) United States Patent
De Foy et al.

(10) Patent No.: US 9,848,022 B2
(45) Date of Patent: Dec. 19, 2017

(54) METHOD AND APPARATUS FOR INTER-DEVICE TRANSFER (HANDOFF) BETWEEN IMS AND GENERIC IP CLIENTS

(71) Applicant: InterDigital Patent Holdings, Inc., Wilmington, DE (US)

(72) Inventors: Xavier De Foy, Kirkland (CA); Robert G. Gazda, Spring City, PA (US); Debashish Purkayastha, Collegeville, PA (US); Kamel M. Shaheen, State College, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/401,722

(22) Filed: Jan. 9, 2017

(65) Prior Publication Data
US 2017/0118257 A1    Apr. 27, 2017

Related U.S. Application Data

(63) Continuation of application No. 15/135,201, filed on Apr. 21, 2016, which is a continuation of application
(Continued)

(51) Int. Cl.
*H04W 4/00* (2009.01)
*H04L 29/06* (2006.01)
(Continued)

(52) U.S. Cl.
CPC ...... *H04L 65/1096* (2013.01); *H04L 65/1016* (2013.01); *H04W 60/00* (2013.01); *H04W 76/023* (2013.01)

(58) Field of Classification Search
None
See application file for complete search history.

(56) References Cited

U.S. PATENT DOCUMENTS

2008/0316976 A1   12/2008   Thompson
2009/0168758 A1*   7/2009   Apelqvist ......... H04L 29/12066
                                                        370/352
(Continued)

OTHER PUBLICATIONS

Third Generation Partnership Project, "Technical Specification Group Services and System Aspects; Service requirements for Home Node B (HNB) and Home eNode B (HeNB) (Release 10)," 3GPP TS 22.220 V10.8.0 (Dec. 2011).
(Continued)

*Primary Examiner* — Zewdu A Beyen
(74) *Attorney, Agent, or Firm* — Invention Mine LLC

(57) ABSTRACT

A method of Inter-User Equipment (UE) Transfer (IUT) for use in an Internet Protocol (IP) Multimedia Subsystem (IMS) capable wireless transmit/receive unit (WTRU), the method comprising: receiving a registration request from a non-IMS capable WTRU; translating the registration request to an IMS based message; transmitting the translated IMS based message to a Service Centralization and Continuity Application Server (SCC AS), transmitting an IUT transfer command, transmitting an IUT process message; receiving an IUT process-accept message; and establishing an IMS session between the non-IMS capable WTRU and the remote party.

18 Claims, 32 Drawing Sheets

Related U.S. Application Data

No. 13/508,307, filed as application No. PCT/US2010/055710 on Nov. 5, 2010, now Pat. No. 9,350,771.

(60) Provisional application No. 61/259,022, filed on Nov. 6, 2009, provisional application No. 61/258,682, filed on Nov. 6, 2009, provisional application No. 61/286,685, filed on Dec. 15, 2009, provisional application No. 61/288,122, filed on Dec. 18, 2009.

(51) Int. Cl.
*H04W 60/00* (2009.01)
*H04W 76/02* (2009.01)

(56) References Cited

U.S. PATENT DOCUMENTS

2010/0030904 A1 2/2010 Oda
2010/0067493 A1 3/2010 Mahdi

OTHER PUBLICATIONS

Third Generation Partnership Project, "Technical Specification Group Services and System Aspects; Service requirements for Home Node B (HNB) and Home eNode B (HeNB) (Release 11)," 3GPP TS 22.220 V11.4.0 (Dec. 2011).

Third Generation Partnership Project, "Technical Specification Group Services and System Aspects; Service requirements for Home Node B (HNB) and Home eNode B (HeNB) (Release 9)," 3GPP TS 22.220 V9.8.0 (Dec. 2011).

Third Generation Partnership Project, "Technical Specification Group Services and System Aspects; IP Multimedia Subsystem (IMS) service continuity enhancements; Service, policy and interaction; Stage 2 (Release 9)," 3GPP TR 23.838 V9.0.0 (Jun. 2009).

Third Generation Partnership Project, "Technical Specification Group Services and System Aspects; IMS Aspects of Architecture for Home NodeB; Stage 2 (Release 9)," 3GPP TR 23.832 V0.5.1 (Sep. 2009).

Third Generation Partnership Project, "Technical Specification Group Services and System Aspects; IP Multimedia Subsystem (IMS) aspects of architecture for Home Node B (HNB); Stage 2 (Release 10)," 3GPP TR 23.832 V10.0.0 (Mar. 2010).

Third Generation Partnership Project, "Technical Specification Group Services and System Aspects; Service requirements for Home NodeBs and Home eNodeBs (Release 10)," 3GPP TS 22.220 V10.0.0 (Sep. 2009).

Third Generation Partnership Project, "Technical Specification Group Services and System Aspects; Service requirements for Home NodeBs and Home eNodeBs (Release 9)," 3GPP TS 22.220 V9.2.0 (Sep. 2009).

Telecom Italia, "UE partially supporting Inter-UE Transfer," 3GPP TSG SA WG2 Meeting #71, S2-091062 (Feb. 16-20, 2009).

Written Opinion of the International Preliminary Examining Authority dated Nov. 23, 2011 for PCT/US2010/055710, 6 pages.

Notification of Transmittal of the International Search Report and the Written Opinion of the International Searching Authority, or the Declaration dated May 25, 2011 for PCT/US2010/055710, 12 pages.

Notification of Transmittal of the International Preliminary Report on Patentability dated Feb. 6, 2012 for PCT/US2010/055710, 7 pages.

* cited by examiner

METHOD AND APPARATUS FOR INTER-DEVICE TRANSFER (HANDOFF) BETWEEN IMS AND GENERIC IP CLIENTS

CROSS REFERENCE TO RELATED APPLICATIONS

This application is a continuation of U.S. patent application Ser. No. 15/135,201 filed on Apr. 21, 2016, which is continuation of U.S. patent application Ser. No. 13/508,307 filed on Aug. 13, 2012, which is a 371 National Phase of International Patent Application No. PCT/US10/55710 filed on Nov. 5, 2010, which claims the benefit of U.S. Provisional Application Ser. No. 61/259,022 filed on Nov. 6, 2009, U.S. Provisional Application Ser. No. 61/258,682 filed on Nov. 6, 2009, U.S. Provisional Application Ser. No. 61/286,685 filed on Dec. 15, 2009, and, U.S. Provisional Application Ser. No. 61/288,122 filed on Dec. 18, 2009, the contents of which are hereby incorporated by reference herein.

BACKGROUND

The Internet Protocol (IP) Multimedia Subsystem (IMS) is an architectural framework for delivering IP-based multimedia services. A wireless transmit/receive unit (WTRU) may connect to an IMS through various access networks, including but not limited to networks based on technology such as Universal Mobile Telecommunication System (UMTS) Terrestrial Radio Access Network (UTRAN), Long Term Evolution (LTE), Worldwide Interoperability for Microwave Access (WiMax), or Wireless Local Area Network (WLAN) technology. A WTRU may access the IMS through a packet-switched (PS) domain. Through the use of IMS Centralized Services (ICS), a WTRU may additionally access IMS services via a circuit-switched (CS) domain. One feature available according to the IMS is the transfer of IMS sessions between multiple IMS-capable WTRUs. Accordingly, it would be advantageous for Inter-User Equipment Transfer (IUT) between an IMS-capable WTRU and a non-IMS-capable WTRU.

SUMMARY

A method of Inter-User Equipment (UE) Transfer (IUT) for use in an Internet Protocol (IP) Multimedia Subsystem (IMS) capable wireless transmit/receive unit (WTRU), the method comprising: receiving, at the IMS capable WTRU, an IUT session transfer command from a non-IMS capable WTRU via non-IMS signaling; translating, at the IMS capable WTRU, the IUT session transfer command to an IMS based message; and transmitting, from the IMS capable WTRU, the translated IMS based message to a Service Centralization and Continuity Application Server (SCC AS).

BRIEF DESCRIPTION OF THE DRAWINGS

A more detailed understanding may be had from the following description, given by way of example in conjunction with the accompanying drawings wherein.

DETAILED DESCRIPTION

Figure 1A:
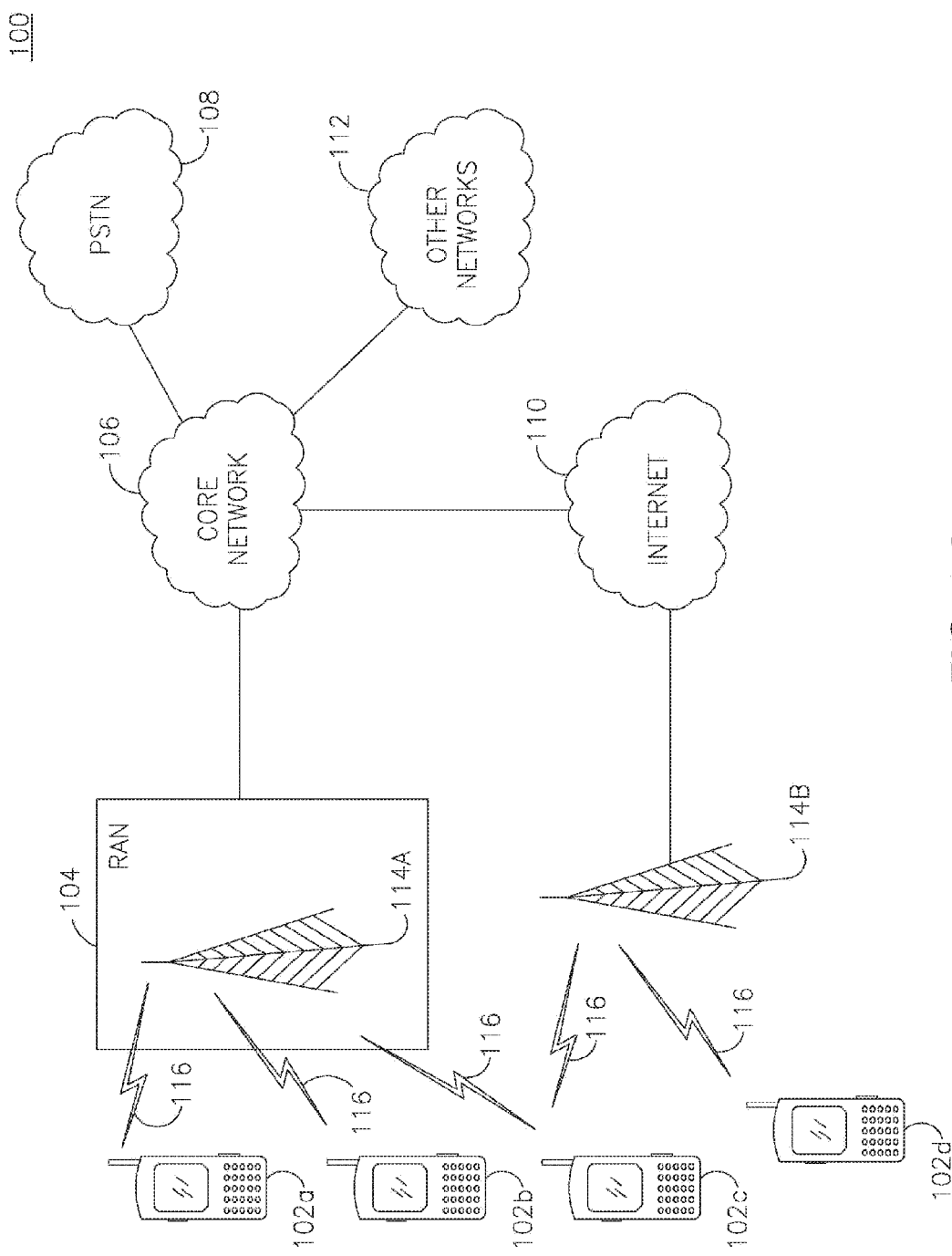
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
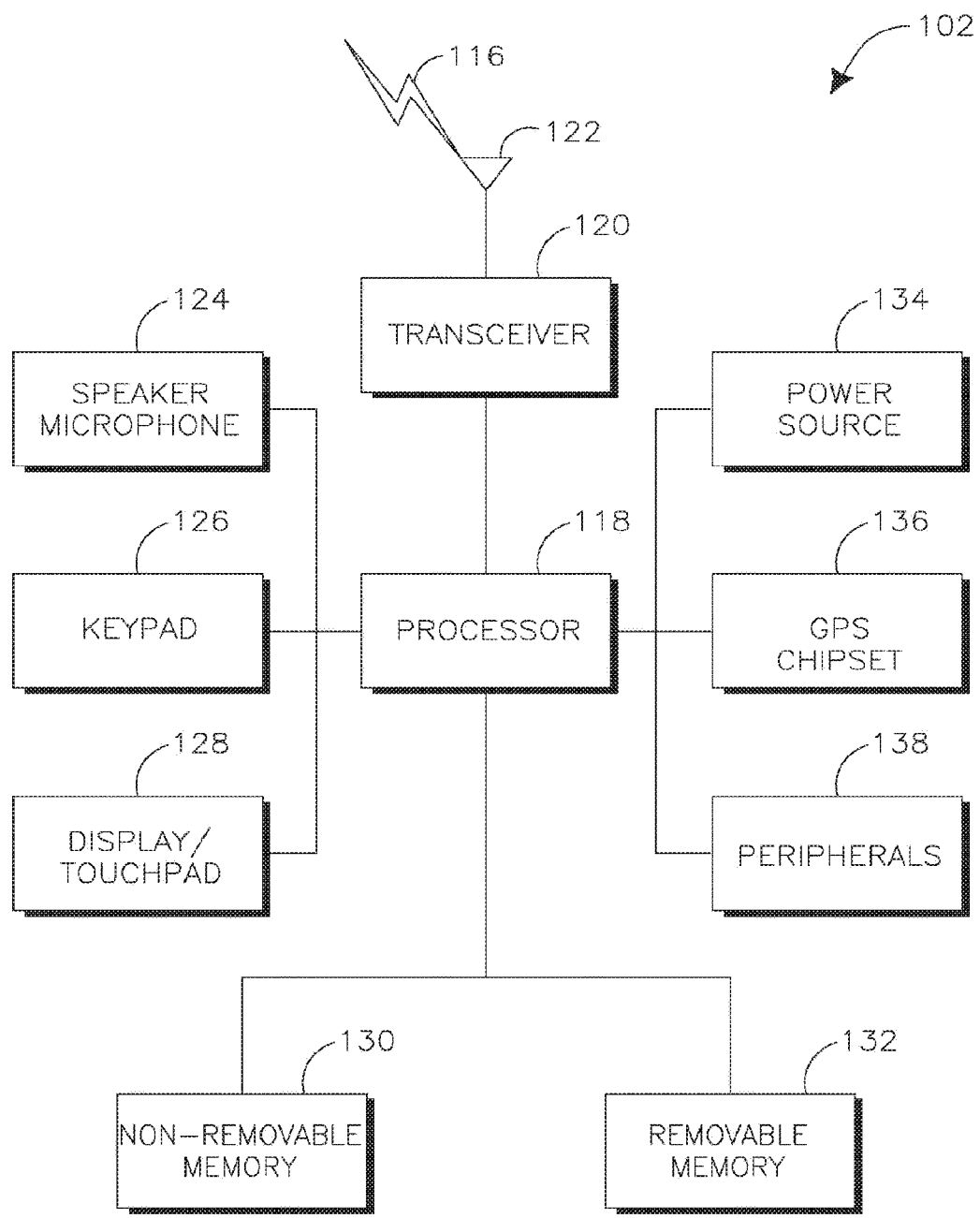
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
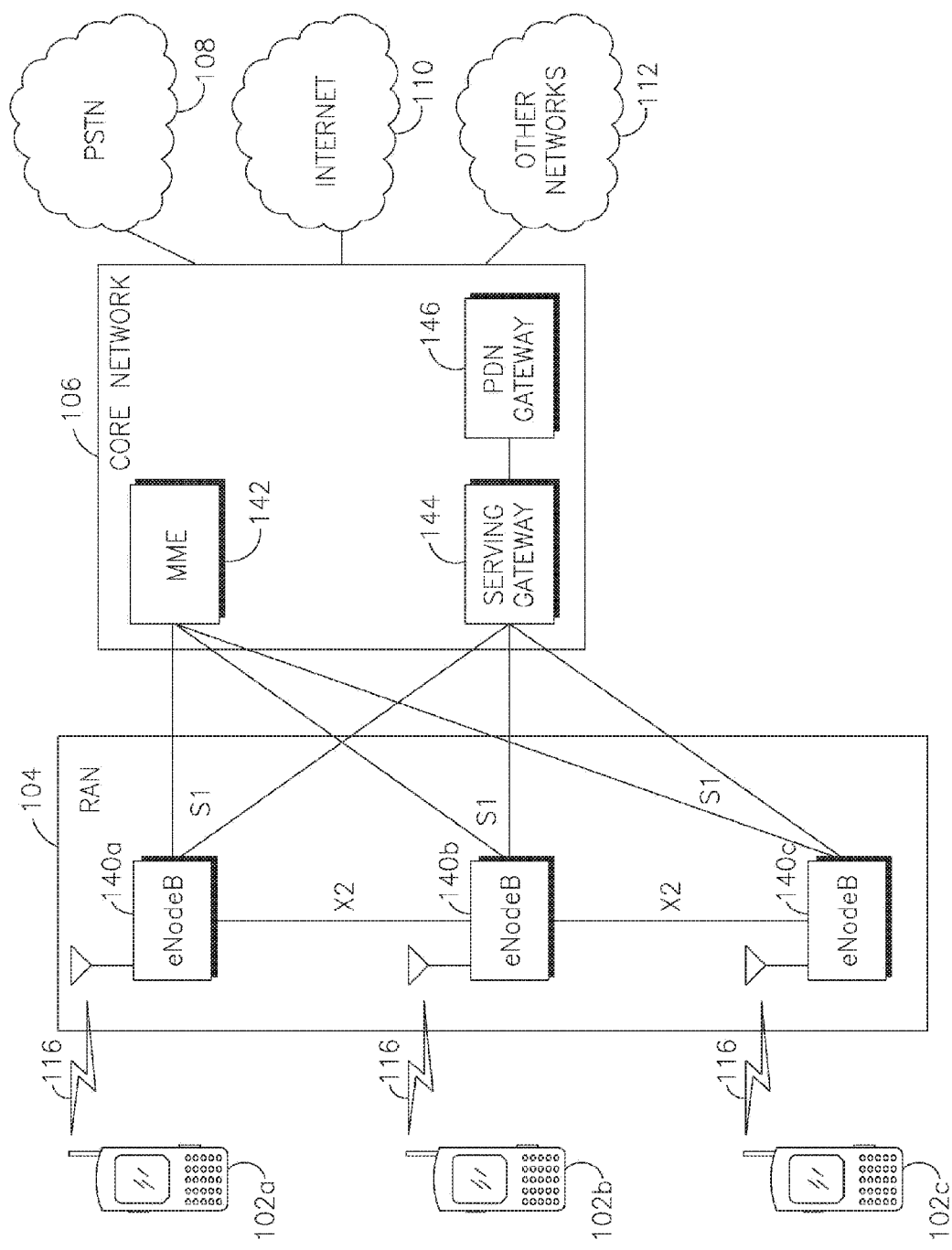
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an Si interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the Si interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 2:
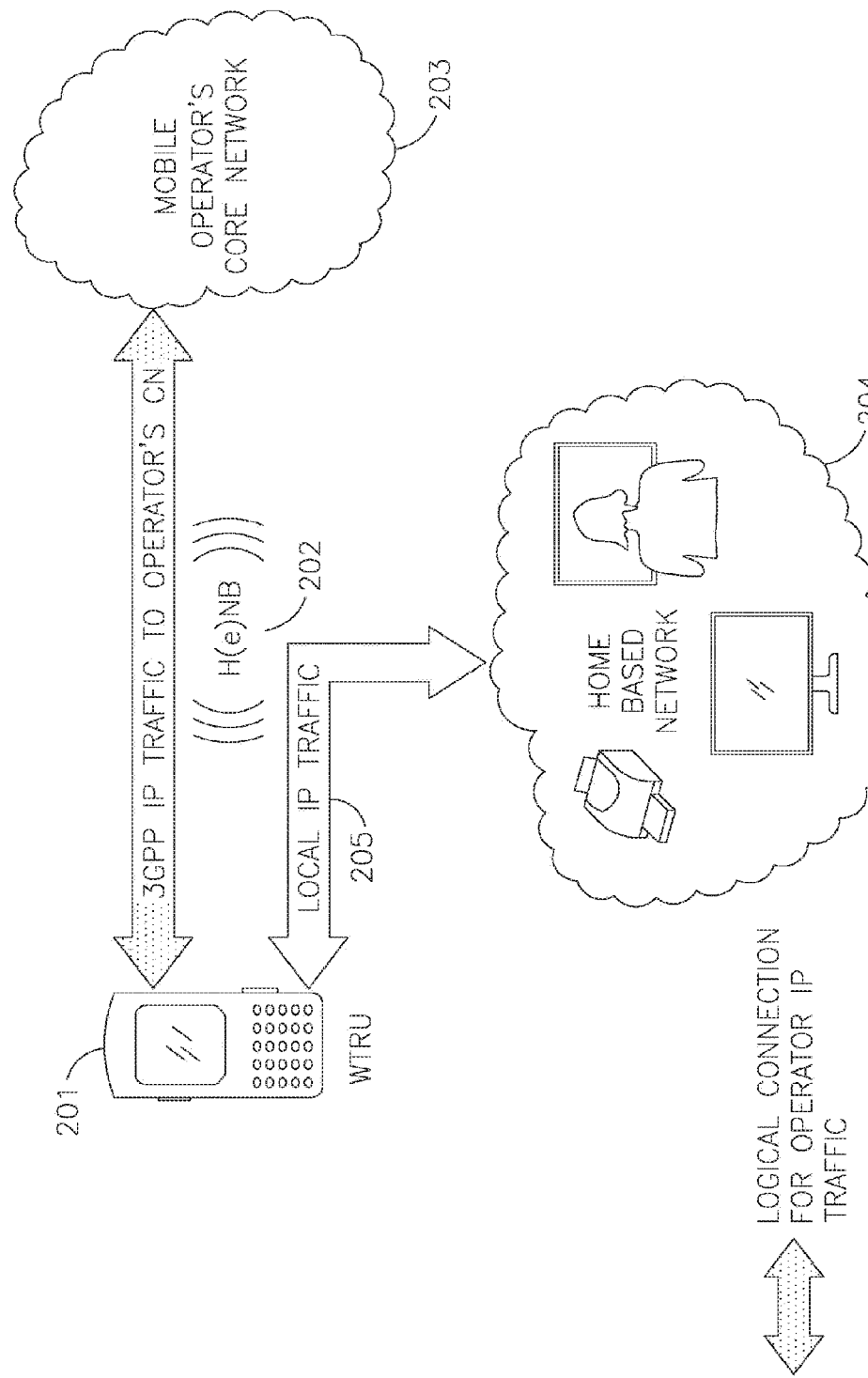
FIG. 2 is an example of an existing H(e)NB basic operation.

FIG. 2 is an example of an existing Home enhanced-Node B (H(e)NB) basic operation. WTRU 201 may be configured to transmit and receive Internet Protocol (IP) traffic via the H(e)NB 202 and the core network 203. WTRU 201 may additionally directly exchange data with other WTRUs via the home based network 204, of which the H(e)NB 202 is a component. The other WTRUs shown in FIG. 2 may include a printer, monitor, and television, for example. Other WTRUs that may be included in a home based network 204 such as the one shown in FIG. 2 include but are not limited to projectors, copiers, and computers such as file servers that serve public or private data folder or other data formats.

These direct connections ("Local IP traffic" 205) through the network created by the H(e)NB 202 may involve the transmission/reception of data at the IP layer or other layers. The traffic for these direct connection does not flow through the operator's core network 203, but are handled solely by the H(e)NB 202. Similar connectivity between a WTRU and the other wireless-capable device may be achieved by, for example, enterprise networks that provide IP connectivity via a WLAN, a Worldwide Interoperability for Microwave Access (WiMAX) network, or other type of network.

Although direct data communications are available between the WTRUs via a H(e)NB, a H(e)NB network may not provide calling plans to support direct calls between WTRUs connected to the H(e)NB. For example, when two WTRUs are connected via the same H(e)NB, if one WTRU places a call to the other, the call may be routed all the way through the core network in order to complete the setup of the call.

Figure 3:
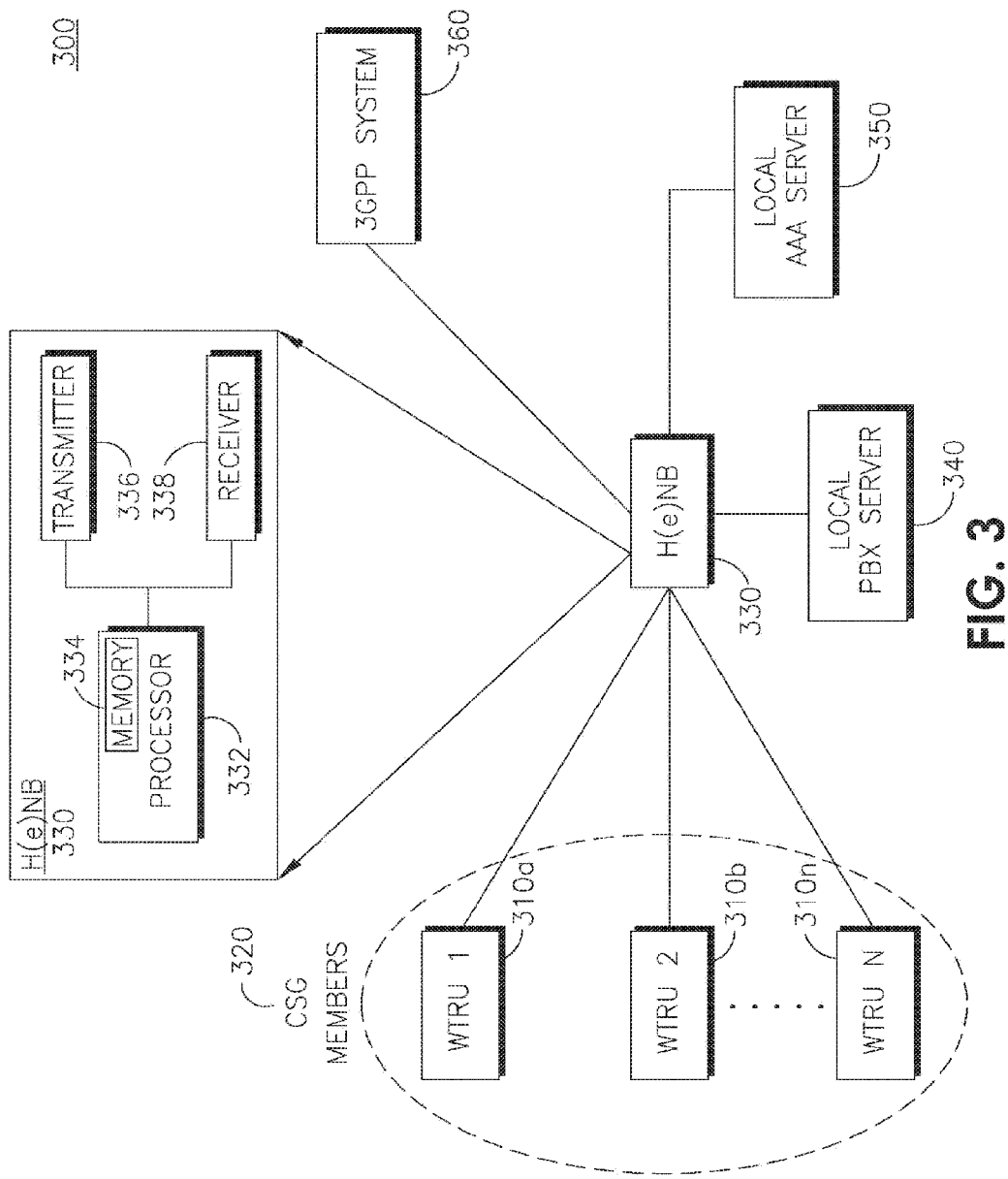
FIG. 3 is an example of local calling within H(e)NB CSG members.

FIG. 3 is an example of routing local calls within H(e)NB to other closed subscriber group (CSG) members 300. This diagram includes a CSG 320, a H(e)NB 330, a local PBX server 340, a local authentication, authorization and accounting (AAA) server 350 and a 3GPP system 360. The CSG members 320 include a list of WTRUs, WTRU 1 310a, and WTRU 2 310b to WTRU N 310n. The CSG members 320 include the WTRUs 310a-310n that has been granted access to the H(e)NB 330. The H(e)NB 330 may include a processor 332 with an optional linked memory 334, transmitter 336, and receiver 338. The processor is configured to communication with a local or the 3GPP backhaul. A local PBX server 340 may be configured to be used for initial connection and establishment between the WTRU 1 310a and the WRTU N 310n.

The local AAA server 350 may be configured to be used for user identity verification, service access options based on the subscriber profiles, and collecting and storing billing-related data including calling plans specifically targeted for the H(e)NB. The H(e)NB maintains a connection to the 3GPP system 360 provider, such as a wireless operator. The local AAA server 350 and the local PBX server 340 are connected to the H(e)NB 330, with which the WTRUs communicate. The H(e)NB 330 is connected to the 3GPP system 360. The PBX server 340 has PBX functionality as detailed in co-pending application Ser. No. 12/917,971 filed on Nov. 2, 2010, which is incorporated by reference herein.

Figure 4:
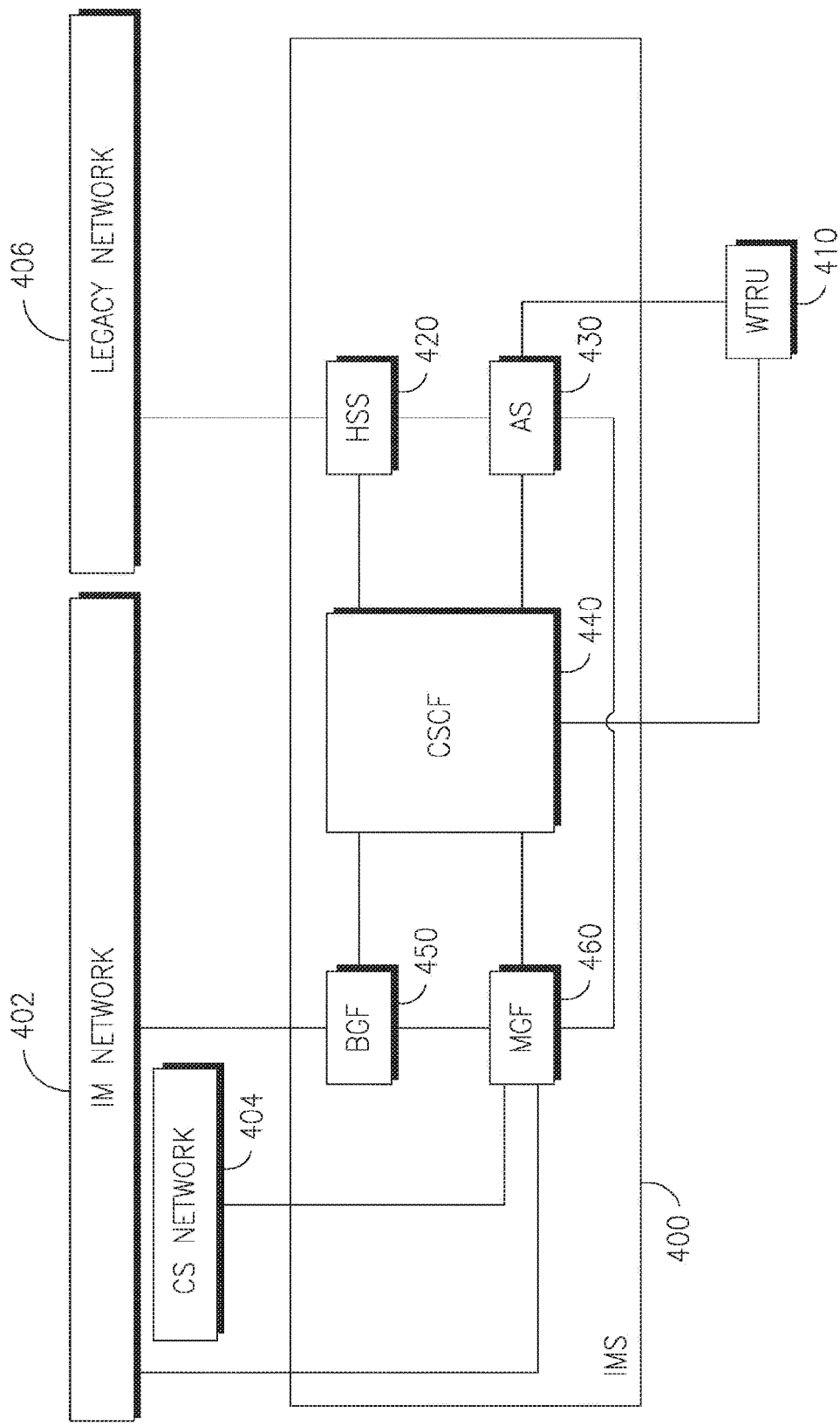
FIG. 4 is an example of a session state before a communication session transfer with collaborative session signaling.

FIG. 4 is a diagram of an example of an Internet Protocol (IP) IP multimedia core network (IM CN), including an IP Multimedia (IM) Subsystem (IMS) 400, an IM network 402, a Circuit Switched (CS) network 404, a legacy network 406, in communication with a wireless transmit/receive unit (WTRU) 410. The IMS 400 includes core network (CN) elements for provision of IM services, such as audio, video, text, chat, or a combination thereof, delivered over the packet switched domain. As shown, the IMS 400 includes a Home Subscriber Server (HSS) 420, an Application Server (AS) 430, a Call Session Control Function (CSCF) 440, a Breakout Gateway Function (BGF) 450, and a Media Gateway Function (MGF) 460, and a Service Centralization and Continuity Application Server (SCC AS) 470. In addition to the logical entities and signal paths shown in FIG. 4, an IMS may include any other configuration of logical entities which may be located in one or more physical devices. Although not shown in this logical example, the WTRU may be a separate physical unit and may be connected to the IM CN via a base station such as, a Node-B or an enhanced-NodeB (eNB).

The WTRU 410 may be any type of device configured to operate and/or communicate in a wired and/or wireless environment.

The HSS 420 may maintain and provide subscription-related information to support the network entities handling IM sessions. For example, the HSS may include identification information, security information, location information, and profile information for IMS users.

The AS 430, which may be a session initiated protocol (SIP) Application Server, an OSA Application Server, or a CAMEL IM-SSF, may provide value added IM services and may reside in a home network or in a third party location. The AS may be included in a network, such as a home network, a core network, or a standalone AS network. The AS may provide IM services. For example, the AS may perform the functions of a terminating user agent (UA), a redirect server, an originating UA, a SIP proxy, or a third party call control.

The CSCF 440 may include a Proxy CSCF (P-CSCF), a Serving CSCF (S-CSCF), an Emergency CSCF (E-CSCF), or an Interrogating CSCF (I-CSCF). For example, a P-CSCF may provide a first contact point for the WTRU within the IMS, a S-CSCF may handle session states, and a I-CSCF may provide a contact point within an operator's network for IMS connections destined to a subscriber of that network operator, or to a roaming subscriber currently located within that network operator's service area.

The BGF 450 may include an Interconnection Border Control Function (IBCF), a Breakout Gateway Control Function (BGCF), or a Transition Gateway (TrGW). Although described as a part of the BGF, the IBCF, the BGCF, or the TrGW may each represent a distinct logical entity and may be located in one or more physical entities.

The IBCF may provide application specific functions at the SIP/SDP protocol layer to perform interconnection between operator domains. For example, the IBCF may enable communication between SIP applications, network topology hiding, controlling transport plane functions, screening of SIP signaling information, selecting the appropriate signaling interconnect, and generation of charging data records.

The BGCF may determine routing of IMS messages, such as SIP messages. This determination may be based on information received in the signaling protocol, administrative information, or database access. For example, for PSTN/CS Domain terminations, the BGCF may determine the network in which PSTN/CS Domain breakout is to occur and may select a MGCF.

The TrGW, may be located on the media path, may be controlled by an IBCF, and may provide network address and port translation, and protocol translation.

The MGF 460 may include a Media Gateway Control Function (MGCF), a Multimedia Resource Function Controller (MRFC), a Multimedia Resource Function Processor (MRFP), an IP Multimedia Subsystem-Media Gateway Function (IMS-MGW), or a Media Resource Broker (MRB). Although described as a part of the MGF, the MGCF, the MRFC, the MRFP, the IMS MGW, or the MRB may each represent a distinct logical entity and may be located in one or more physical entities.

The MGCF may control call state connection control for media channels in IMS; may communicate with CSCF, BGCF, and circuit switched network entities; may determine routing for incoming calls from legacy networks; may perform protocol conversion between ISUP/TCAP and the IM subsystem call control protocols; and may forward out of band information received in MGCF to CS CF/IMS-MGW.

The MRFC and MRFP may control media stream resources. The MRFC and MRFP may mix incoming media streams; may source media streams, for example for multimedia announcements; may process media streams, such as by performing audio transcoding, or media analysis; and may provide floor control, such as by managing access rights to shared resources, for example, in a conferencing environment.

The IMS-MGW may terminate bearer channels from a switched circuit network and media streams from a packet network, such as RTP streams in an IP network. The IMS-MGW may support media conversion, bearer control and payload processing, such as, codec, echo canceller, or conference bridge. The IMS-MGW may interact with the MGCF for resource control; manage resources, such an echo canceller; may include a codec. The IMS-MGW may include resources for supporting UMTS/GSM transport media.

The MRB may support the sharing of a pool of heterogeneous MRF resources by multiple heterogeneous applications. The MRB may assign, or releases, specific MRF resources to a call as requested by a consuming application, based on, for example, a specified MRF attribute. For example, when assigning MRF resources to an application, the MRB may evaluate the specific characteristics of the media resources required for the call or calls; the identity of the application; rules for allocating MRF resources across different applications; per-application or per-subscriber SLA or QoS criteria; or capacity models of particular MRF resources.

The SCC AS 470 may provide communication session service continuity, such as duplication, transfer, addition, or deletion of communication sessions, among multiple WTRUs, for example, in a subscription. The SCC AS may perform Access Transfer, Session Transfer or Duplication, Terminating Access Domain Selection (T-ADS), and Handling of multiple media flows. The SCC AS may send an instruction to the MGF/MGW to combine or split media flows over one or more Access Networks. For example, a media flow may be split or combined for Session Transfers, session termination, upon request by the WTRU to add media flows over an addition Access Network during the setup of a session, or upon request by the WTRU to add or delete media flows over one or more Access Networks to an existing session.

A communication session may be performed using a communication system, such as the communication system shown in FIG. 1A, between a WTRU, such as the WTRU shown in FIG. 1B, and a remote device. The WTRU may access the communication system via a RAN, such as the RAN shown in FIG. 1C, or any other wired or wireless access network. The communication session may include services, such as IP multimedia (IM) services provided by the IMS as shown in FIG. 4. Although described with reference to IMS herein, session duplication may be performed using any communication system or access network.

The WTRU, the remote device, or the network may control the communication session. Control of the communication session may include, for example, starting or stopping a media flow, adding or removing a media flow, transferring or duplicating a media flow on another WTRU, adjusting a bit-rate, or terminating the communication. For example, a WTRU may initiate a communication session with a remote device. The WTRU may initially control the communication session. The WTRU may pass or share control of the communication session with the remote device.

Figure 5:
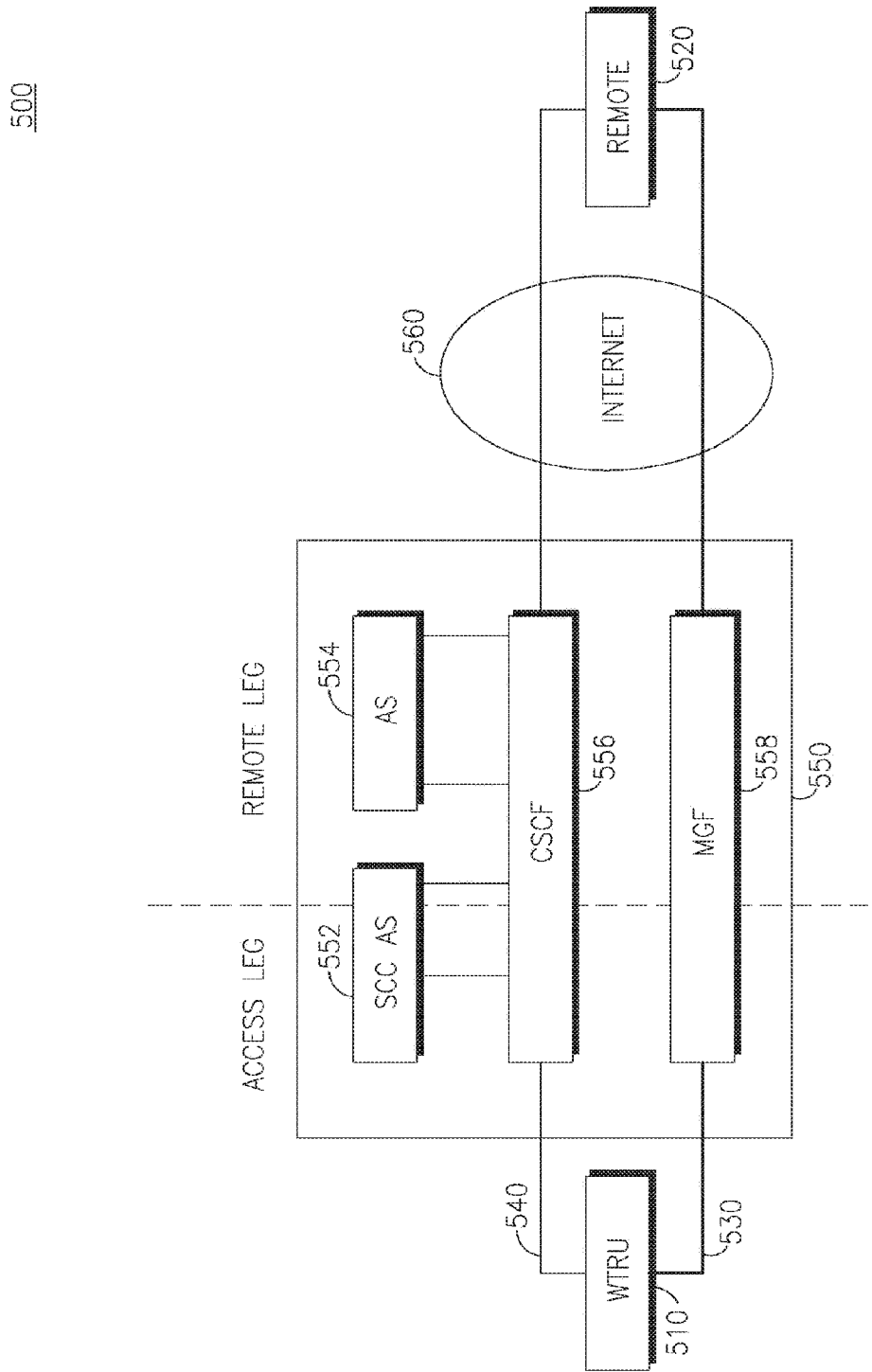
FIG. 5 is an example of a session state after a communication session transfer with collaborative session signaling.

FIG. 5 shows a diagram of an example of a communication session 500 between a WTRU 510 and a remote device 520 using IMS. The communication session 500 may include media flows 530 (media path) and control signaling 540 (control path) between the WTRU 510 and the remote device 520 via a network 550, such as an IM CN as shown in FIG. 2. The IM CN 550 may include an SCC AS 552, an AS 554, a CSCF 556, and a MGF 558.

The communication session 500 may be anchored at the SCC AS 552 associated with the WTRU 510. For example, the SCC AS 552 may maintain information regarding the communication session, such as media flow identifiers and controlling device identifiers, and may provide call control, such as session duplication, for the communication session 500. For simplicity, the part of the communication session between the WTRU 510 and the SCC AS 552 may be referred to as the access leg, and the part of the communication session between the SCC AS 552 and the remote device 520 may be referred to as the remote leg.

To establish a communication session 500 using IMS the WTRU 510 may initiate a connection (access leg) via the IM CN 550. The WTRU 510 may receive the media flows 530 via the MGF 558 and control signaling 540 via the CSCF 556. The remote device 520 may participate in the communication session 500 via a remote network (remote leg), such as via the Internet 560.

Figure 6A:
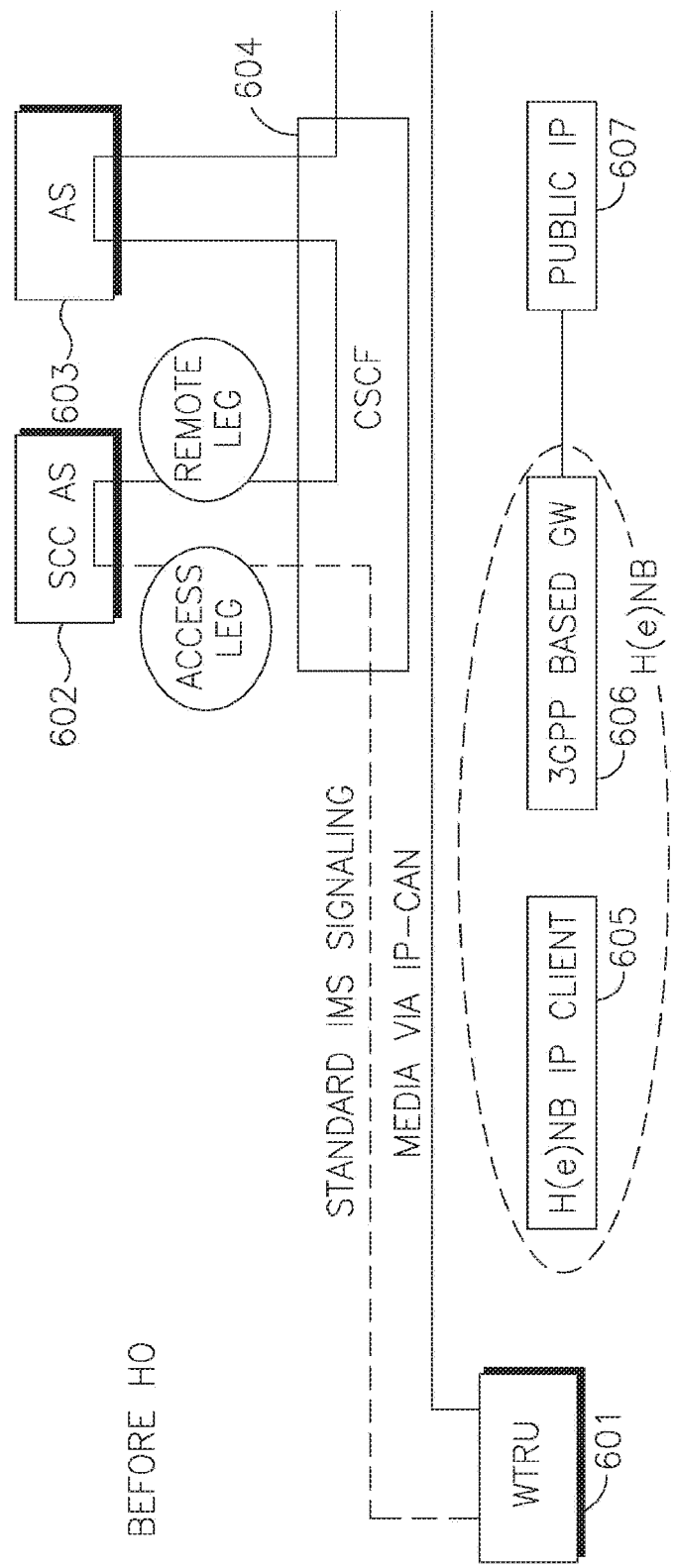
FIG. 6A depicts an architecture prior to handover of an IMS session between an IMS capable WTRU and non-IMS capable WTRU.

FIG. 6A shows architecture prior to handover (HO) of an IMS session between an IMS capable WTRU and a non-IMS capable WTRU. In this example, the transferring WTRU 601 (the IMS capable WTRU) has an active IMS session. The transferring WTRU 601 may receive data from an IMS via an IP-CAN provided by an access point. The transferring WTRU 601 may receive the data from the IMS via an IMS Media Gateway (MGW) (not shown). The user plane data path by which the transferring WTRU 601 may receive media data, shown by the sold line from the transferring WTRU 601. The WTRU also may have a control plane signaling connection to the CSCF 604, shown by the dashed line from the transferring WTRU 601 to the CSCF 604. The CSCF 604 may be in communication with a SCC AS 602 and an AS 603.

The H(e)NB IP Client 605 (transferee WTRU) may have a data connection via the gateway (GW) 606, and may receive IP data from the public IP network 607 via the GW 606. The GW 606 may be, for example a HNB-GW, a H(e)NB-GW, or another gateway node based on 3GPP technology. The transferring WTRU 601 and/or the H(e)NB IP Client 605 and/or a network element may initiate a transfer of the IMS session to the H(e)NB IP Client.

Figure 6B:
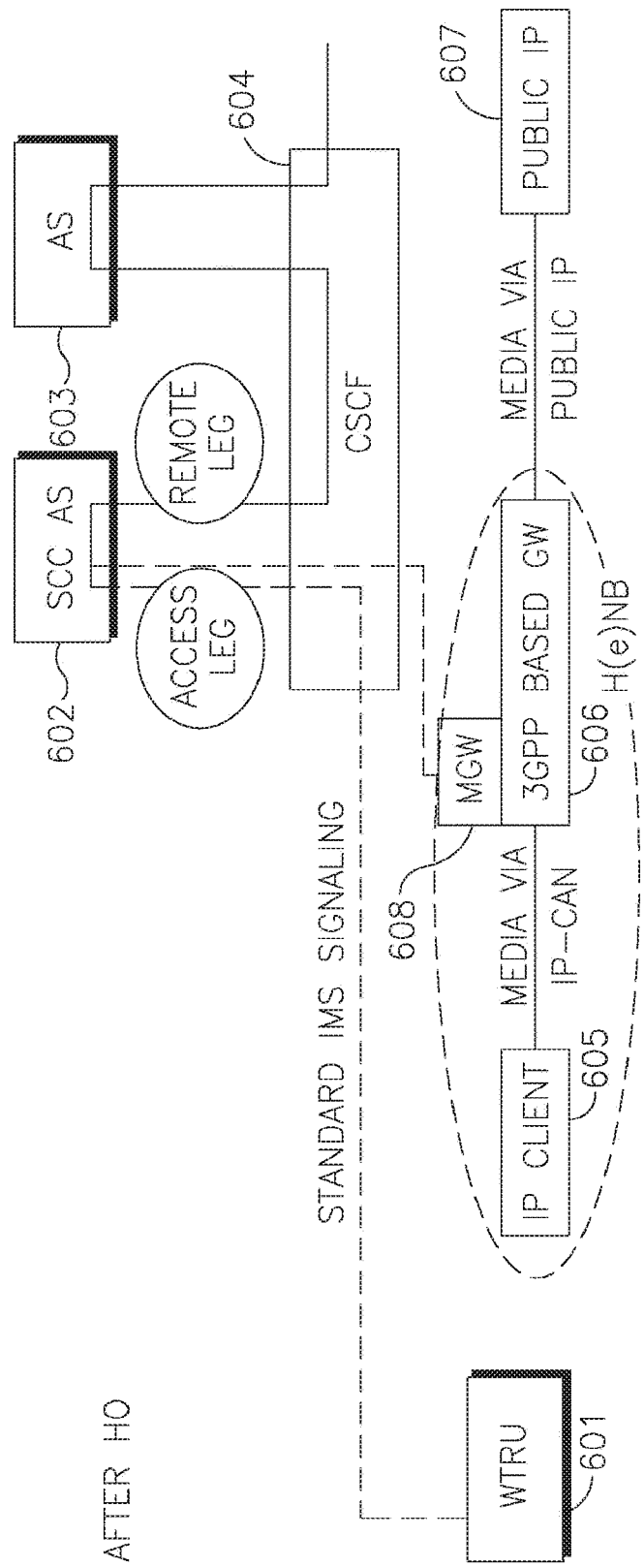
FIG. 6B depicts an architecture after handover of an IMS session between an IMS capable WTRU and non-IMS capable WTRU.

FIG. 6B shows architecture after HO of an IMS session between an IMS capable WTRU and a non-IMS capable WTRU. In this example, the transferring WTRU 601 may maintain a control plane connection to the CSCF 604, shown by the dashed line from the transferring WTRU 601 to the CSCF 604. The MGW 608 may communicate with the CSCF 604 and may communicate directly with the SCC AS 602 and/or indirectly with the SCC AS 602 via the CSCF 604. The H(e)NB IP Client 605 (transferee WTRU) receives media data according to the transferred IMS session. The media data travels along the data path, indicated by the solid line, from the H(e)NB IP Client 605 to the MGW 608 and from the MGW 608 to the public IP network 607. As the H(e)NB IP Client 605 is non-IMS capable, the IMS session may not terminate at the H(e)NB IP Client 605. Nonetheless, the H(e)NB IP Client 605 may be able to receive the media data according to the IMS session.

Figure 7:
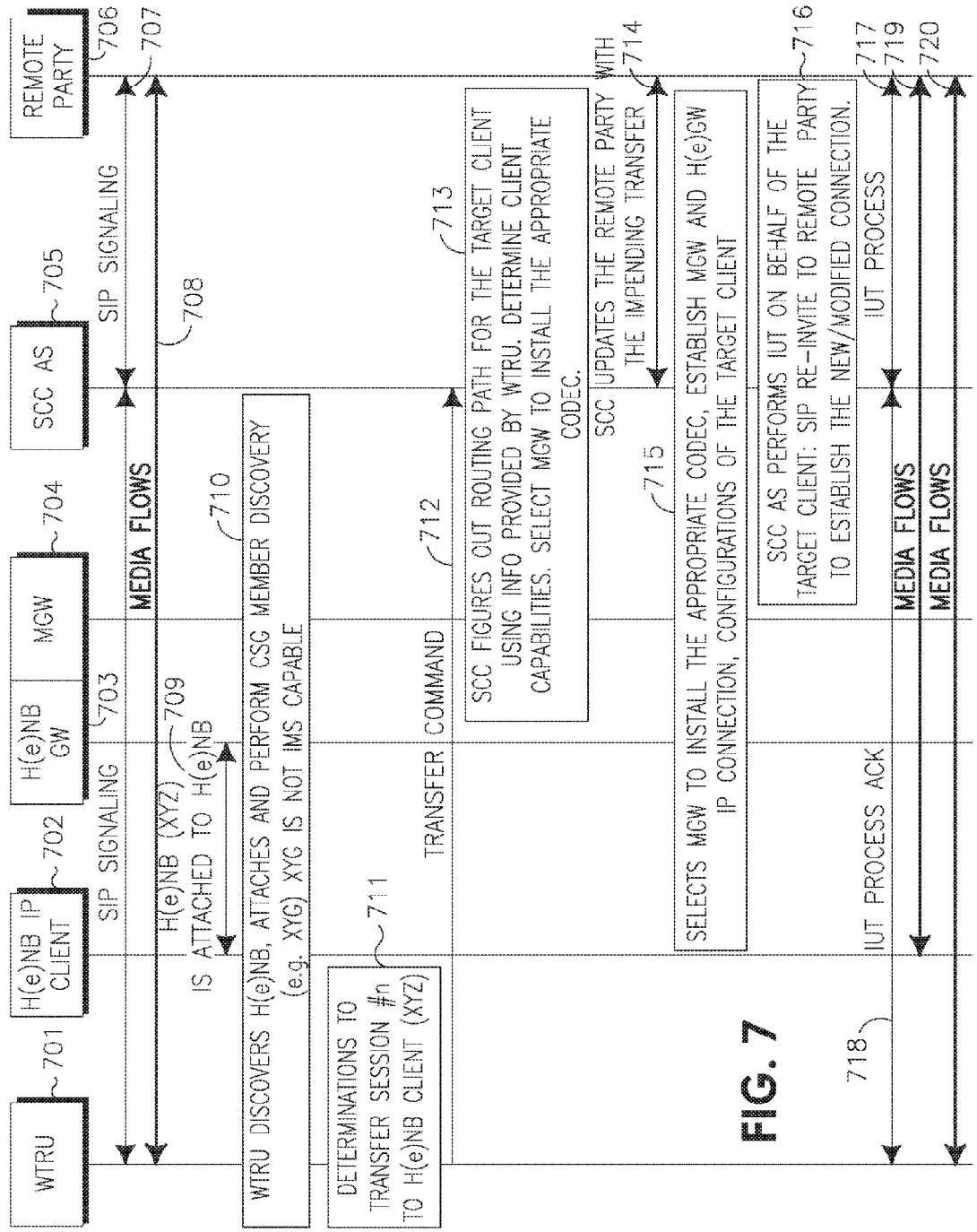
FIG. 7 is an example method for the transfer of an IMS session from an IMS capable WTRU to a non-IMS capable WTRU using the architecture of FIGS. 6A-B.

FIG. 7 shows a first example method for the transfer of an IMS session from an IMS capable WTRU to a non-IMS capable WTRU using the architecture shown in FIGS. 6A and 6B. The transferring WTRU 701 may use SIP control signaling to establish control plane connectivity with the SCC AS 705. SIP signaling may be used to establish connectivity to the Remote Party 706 in step 707. The IMS capable WTRU 701 and the Remote Party 706 may establish IMS media flows in step 708. H(e)NB IP Client 702 may attach to H(e)NB 703 gateway in step 709. The IMS capable WTRU 701 may discover the H(e)NB IP Client 702 and attach and perform CSG member discovery to obtain information about other WTRUs connected to the H(e)NB IP Client 702 in step 710. The IMS capable WTRU 701 may obtain information from the H(e)NB IP Client 702 during this procedure that indicates that the transferee is not IMS capable.

The IMS capable WTRU 701 may make a determination to transfer IMS session #n to the H(e)NB IP Client 702 in step 711. This determination may be based on one or more hard-coded or preconfigured parameters/profiles, and/or may be based on input from a user. The IMS capable WTRU 701 may send a transfer command message to the SCC AS 705 in step 712. The transfer command may include a Media Type, a Session ID, a target device ID/Contact Information/capabilities, a H(e)NB ID, or session connection information.

In response to receiving the transfer command, the SCC AS 705 may determine a routing path for the H(e)NB IP Client 702 using information provided by the IMS capable WTRU 701 in step 713. The SCC AS 705 may determine H(e)NB IP Client 702 capabilities and select the MGW 704 to install the appropriate codec. The SCC AS 705 may update the Remote Party 706 with the impending transfer in step 714. The impending transfer may include a Media Type, Session ID, Target ID, or session connection information.

The SCC AS 705 may signal the MGW 704 to install the appropriate Codec, establish the MGW 704 and H(e)NB GW 703 IP connection and configurations of the H(e)NB IP Client 702 in step 715. The SCC AS 705 may perform an Inter-User Equipment Transfer (IUT) on behalf of the transferee WTRU 701 in step 716. The SCC AS 705 may send a SIP Re-Invite message to the Remote Party 706 to establish a new/modified connection. The SCC AS 705 may send an IUT process to the Remote Party 706 in step 717. The SCC AS 705 may send an IUT process ACK to the transferee WTRU 701 in step 718.

The H(e)NB IP Client 702 may establish media flows (session #n) with the Remote Party 706 in step 719. The IMS capable WTRU 701 may establish media flows (session with or without #n) with the Remote Party 706 in step 720.

At any point in the method of FIG. 7, additional actions may be performed between the IMS capable WTRU 701, H(e)NB IP Client 702, H(e)NB GW 703, MGW 704, SCC AS 705, and Remote Party 706 according to IMS IUT processes. Upon completion of the embodiment shown in FIG. 7, the H(e)NB IP Client 702 and the IMS capable WTRU 701 may participate in a collaborative session or the session may have been transferred to the IMS capable WTRU 701.

Figure 8:
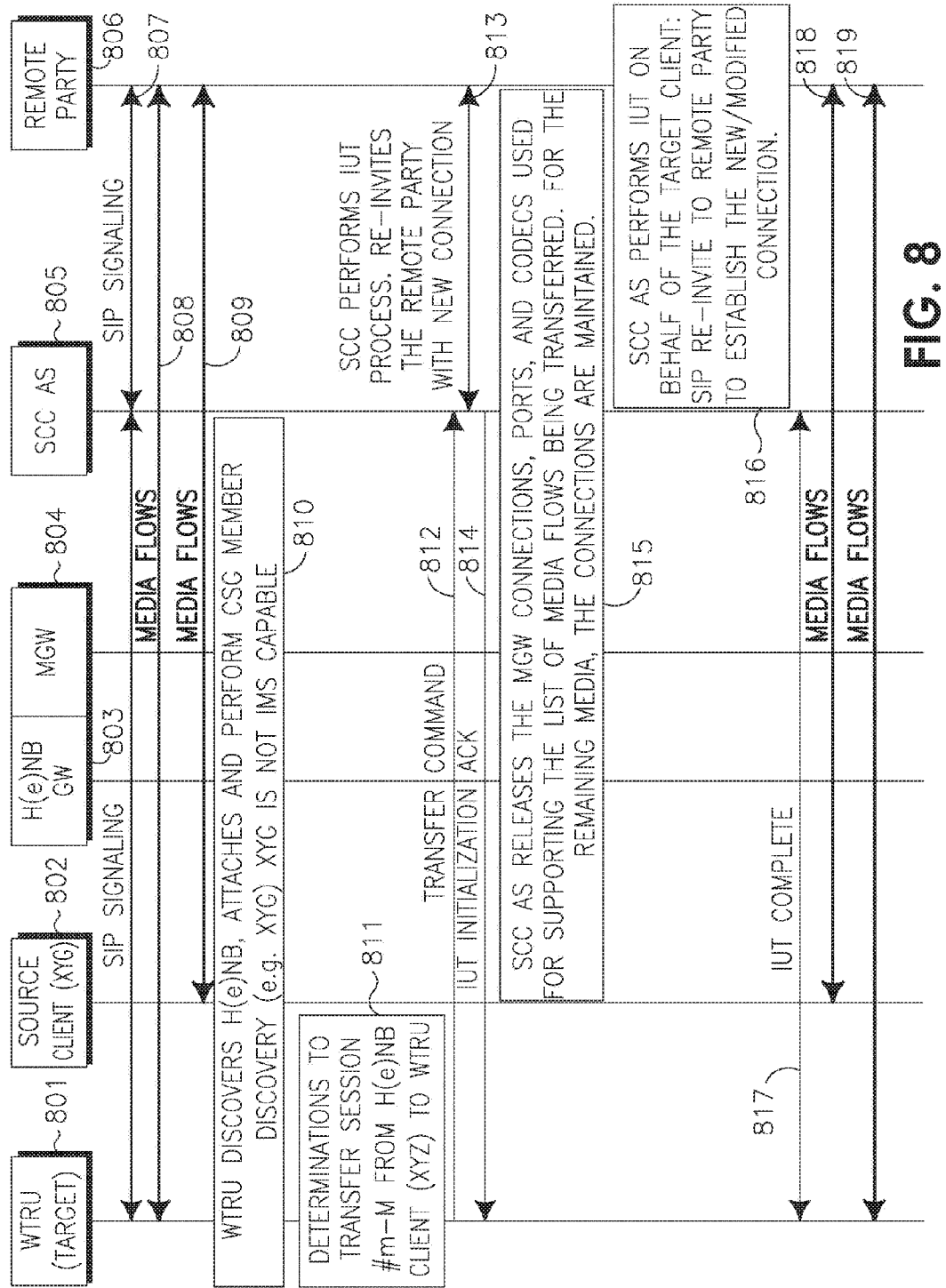
FIG. 8 is a first example method for the transfer of an IMS session from a non-IMS capable WTRU to an IMS capable WTRU using the reverse architecture of FIGS. 6A-B.

FIG. 8 shows a first example method for transfer of an IMS Session from a non-IMS capable WTRU to an IMS capable WTRU using the reverse architecture of FIGS. 6A-B. In this embodiment the SCC AS 805 may initiate a transfer of an IMS Session from a non-IMS capable WTRU to an IMS capable WTRU. The SCC AS 805 communicates with a Remote Party 806 and with an IMS capable WTRU (Target) 801 via SIP signaling in step 807. The IMS capable WTRU 801 and the Remote Party 806 may establish media flows in step 808. The Remote Party 806 and the Source Client (XYG) 802 may establish media flows in step 809.

The IMS capable WTRU 801 may discover H(e)NB and attach and perform CSG member Discovery to obtain information about other WTRUs connected to the H(e)NB in step 810. The IMS capable WTRU 801 may obtain information from the H(e)NB that indicates that the transferee is not IMS capable. The IMS capable WTRU 801 may make a determination to transfer IMS session #m-M from the H(e)NB Client to the transferee WTRU 801 via a preconfigured trigger or user input in step 811. The IMS capable WTRU 801 may send a transfer command message to the SCC AS 805 in step 812. The transfer command may include a Media Type, Session ID, target device information, source device ID/Contact Information/capabilities, H(e)NB ID, or session connection information. The SCC AS 805 may update the Remote Party 806 with information that a transfer is being requested.

The SCC AS 805 may perform an IUT process, re-inviting the Remote Party 806 with new connections in step 813, including media type, Session ID, Target ID, or session connection information. The SCC AS 805 may send an IUT initialization acknowledgement (ACK) to the IMS capable WTRU 801 in step 814. The SCC AS 805 may release the MGW 804 connections, ports, and Codecs used for supporting the list of media flows being transferred in step 815. For the remaining media, the connections are maintained. The SCC AS 805 may perform IUT on behalf of the IMS capable WTRU 801 in the form of a SIP Re-Invite message to the Remote Party 806 to establish a new/modified connection in step 816. The IMS capable WTRU 801 may send an IUT complete message to the SCC AS 805 in step 817. The IMS capable WTRU 801 may establish media flows (session #n, session #m-#M) with the Remote Party 806 in step 818. The Source Client (XYG) 802 may establish media flows (without session #m-#M) with a Remote Party 806 in step 819.

At any point in the method of FIG. 8, additional actions may be performed between the IMS capable WTRU 801, Source Client (XYG) 802, H(e)NB GW 803, MGW 804, SCC AS 805, and Remote Party 806 according to IMS IUT processes. Upon completion of the embodiment shown in FIG. 8, the Source Client (XYG) 802 and the IMS capable WTRU 801 may participate in a collaborative session or the session may have been transferred to the IMS capable WTRU 801.

Figure 9:
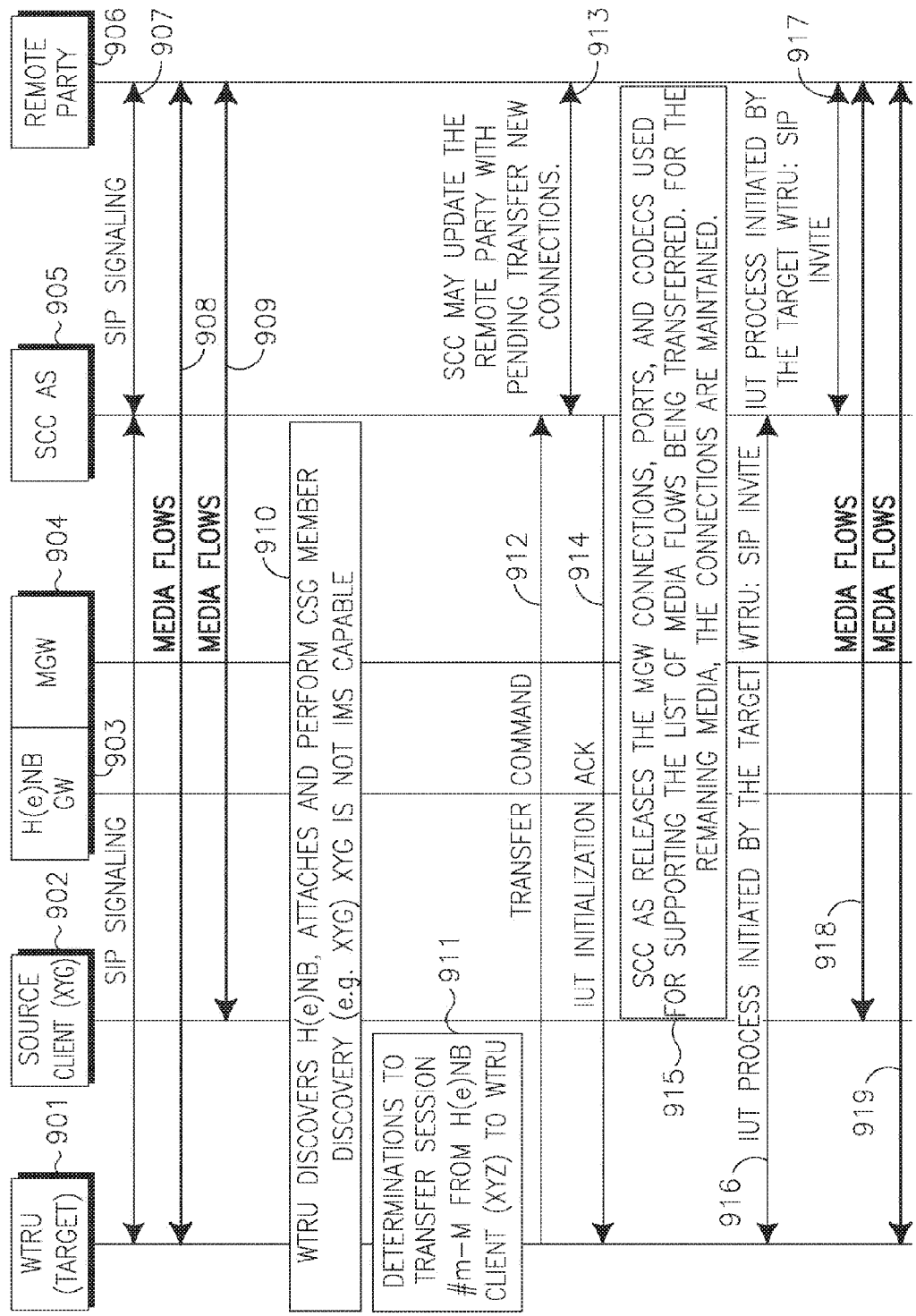
FIG. 9 is a second example method for the transfer of an IMS session from a non-IMS capable WTRU to an IMS capable WTRU using the reverse architecture of FIGS. 6A-B.

FIG. 9 shows a second example method for transfer of an IMS Session from a non-IMS capable WTRU to an IMS capable WTRU using the reverse architecture of FIGS. 6A-B. In this embodiment the IMS capable WTRU (Target) 901 may initiate a transfer of an IMS Session from a non-IMS capable WTRU to an IMS capable WTRU. The SCC AS 905 communicates with a Remote Party 906 and with a IMS capable WTRU 901 via SIP signaling in step 907. The IMS capable WTRU 901 and the Remote Party 906 may establish media flows in step 908. The Remote Party 906 and the Source Client (XYG) 902 may establish media flows in step 909.

The IMS capable WTRU 901 may discover H(e)NB and attach and perform CSG member Discovery to obtain information about other WTRUs connected to the H(e)NB in step 910. The IMS capable WTRU 901 may obtain information from the H(e)NB during this procedure that indicates that the transferee is not IMS capable. The IMS capable WTRU 901 may make a determination to transfer IMS session #m-M from the H(e)NB Client to the IMS capable WTRU 901 via a preconfigured trigger or user input in step 911. The IMS capable WTRU 901 may send a transfer command message to the SCC AS 905 in step 912. The transfer command may include a Media Type, Session ID, target device information, source device ID/Contact Information/capabilities, H(e)NB ID, or session connection information. The SCC AS 905 may update the Remote Party 906 with information that a transfer is being requested.

The SCC AS 905 may perform an IUT process, re-inviting the Remote Party 906 with new connections in step 913, including media type, Session ID, Target ID, or session connection information. The SCC AS 906 may transfer an IUT initialization ACK to the IMS capable WTRU 901 in step 914. The SCC AS 905 may release the MGW 904 connections, ports, and codecs used for supporting the list of media flows being transferred in step 915. For the remaining media, the connections are maintained. An IUT process may be initiated by the IMS capable WTRU 901 that includes a SIP invite and is sent to the SCC AS 905 in step 916. The SCC AS 905 may transfer the IUT process initiated by the IMS capable WTRU 901 including the SIP invite to the Remote Party 906 in step 917. The IMS capable WTRU 901 may establish media flows (session #n, session #m-#M) with a Remote Party 906 in step 918. The Source Client (XYG) 902 may establish media flows (without session #m-#M) with the Remote Party 906 in step 919.

At any point in the method of FIG. 9, additional actions may be performed between the IMS capable WTRU 901, Source Client (XYG) 902, H(e)NB GW 903, MGW 904, SCC AS 905, and Remote Party 906 according to IMS IUT processes. Upon completion of the embodiment shown in FIG. 9, the Source Client (XYG) 902 and the IMS capable WTRU 901 may participate in a collaborative session or the session may have been transferred to the IMS capable WTRU 901.

Figure 10A:
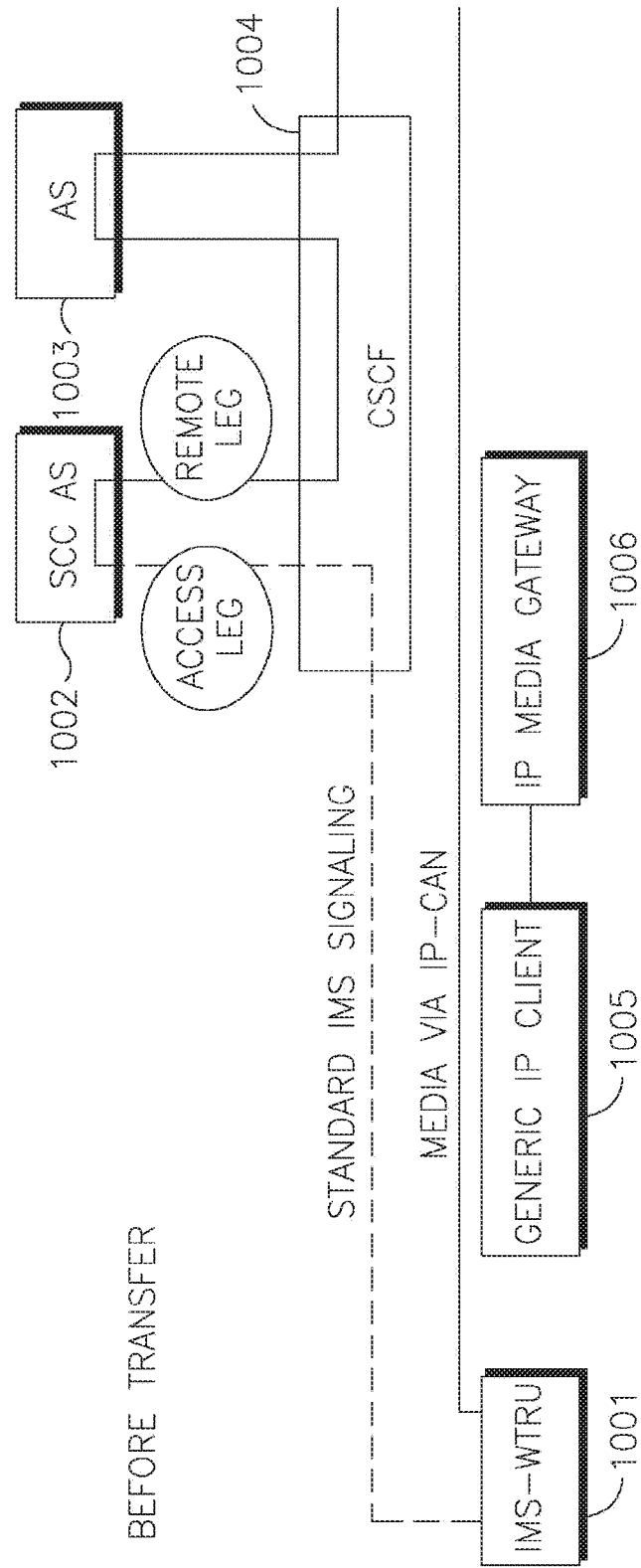
FIG. 10A is a first example of architecture prior to handover of IMS session transfer from an IMS WTRU to a Generic IP Client utilizing an IMS/IP Bridge.

FIG. 10A shows a first example architecture prior to HO of IMS session transfer from an IMS WTRU 1001 to a Generic IP Client utilizing an IMS/IP Bridge 1007. In this example, the IMS WTRU 1001 may connect to a media via an IP-CAN, for example, the Internet. The IMS WTRU 1001 may also connect to a CSCF 1004 which may include the use of SIP messages. The SCC AS 1002 may anchor the IMS sessions. The SCC AS 1002 and the AS 1003 may manage, for example, the access leg and remote leg of the IMS session for the IMS WTRU 1001. The IMS WTRU 1001 may receive media data via the IMS and IP-CAN. The Generic IP Client 1005 does not have an active IMS connection at this time, but may be connected to an IP Media Gateway 1006.

Figure 10B:
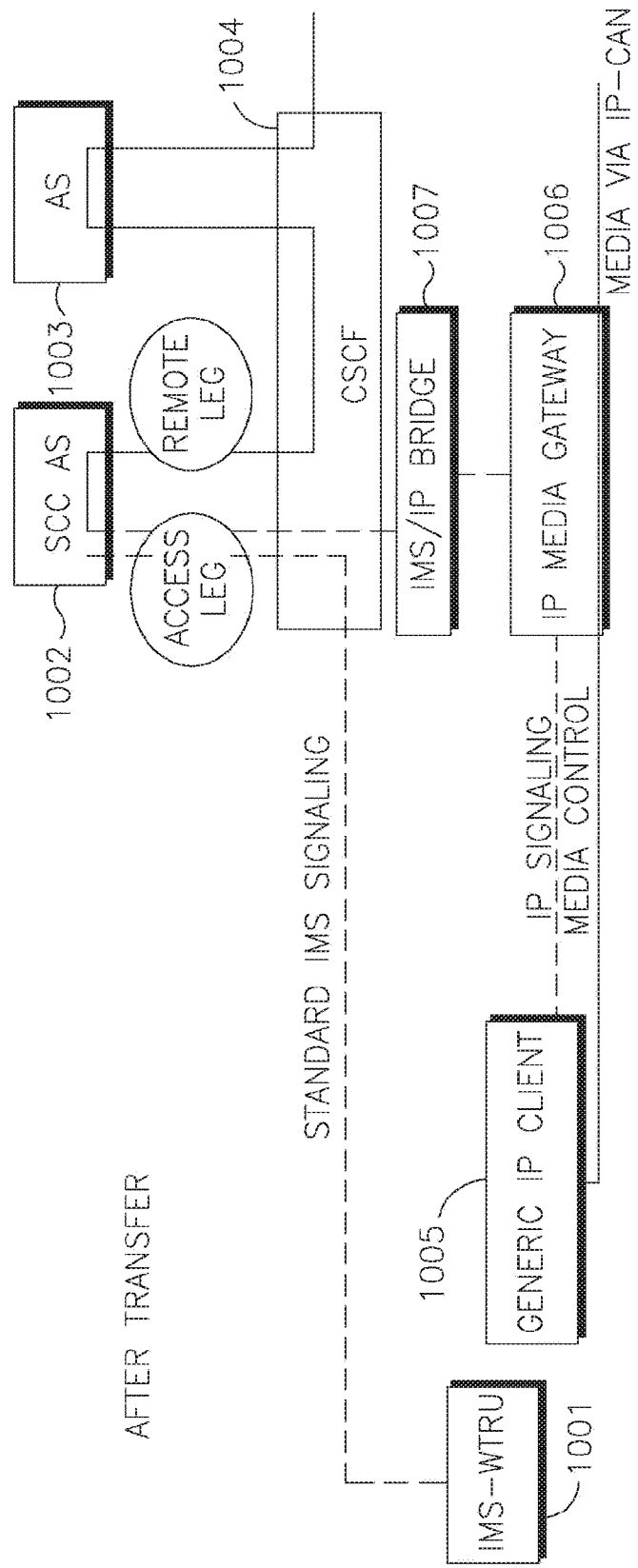
FIG. 10B is a first example of architecture for after handover of IMS session transfer from an IMS WTRU to a Generic IP Client utilizing an IMS/IP Bridge.

FIG. 10B shows a first example architecture after HO of IMS session transfer from an IMS WTRU 1001 to a Generic IP Client utilizing an IMS/IP Bridge 1007. In this example, the IMS WTRU 1001 may maintain a connection to the CSCF 1004. The IMS/IP Bridge 1007 may communicate with the CSCF 1004 and may communicate directly with the SCC AS 1002 and/or indirectly with the SCC AS 1002 via the CSCF 1004. The IMS/IP Bridge 1007 may broker IMS to IP transfer. This may be accomplished by translating the SIP message to a message protocol required by the Generic IP Client 1005 (a device that may not support SIP or IMS signaling). The IMS/IP Bridge 1007 may connect to the IP Media Gateway 1006 which then may connect to the Generic IP Client 1005. The Generic IP Client 1005 may appear as an IMS client on another network or subscription. All of these connections may support bidirectional signaling/messaging.

Figure 11A:
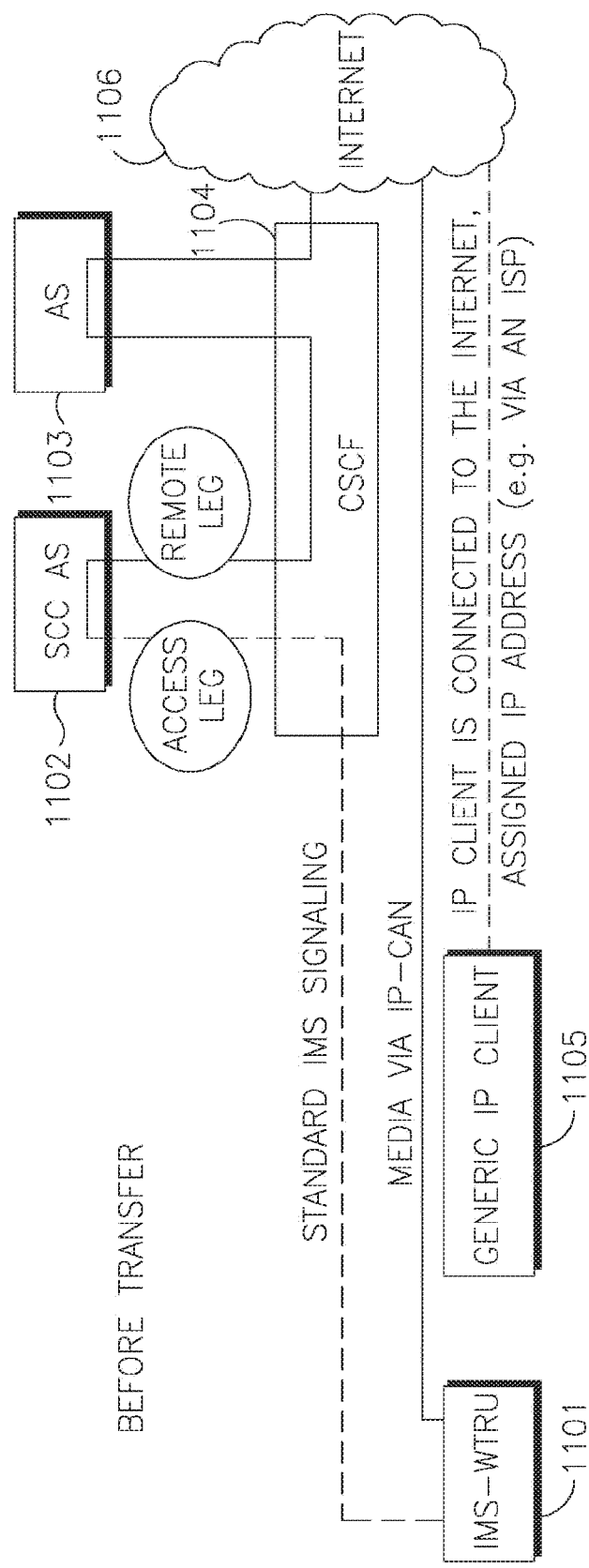
FIG. 11A is a second example architecture prior to handover of IMS session transfer from an IMS WTRU to a Generic IP Client utilizing a direct peer-to-peer connection.

FIG. 11A shows a second example architecture prior to HO of IMS session transfer from IMS WTRU 1101 to a Generic IP Client utilizing a direct peer-to-peer connection. In this example, the IMS WTRU 1101 may connect to a media via the IP-CAN. The IMS WTRU 1101 may also connect to a CSCF 1104 which may be done via SIP-based messages. The SCC AS 1102 may anchor the IMS sessions. The SCC AS 1102 and the AS 1103 may manage, for example, the access leg and remote leg of the IMS session for the IMS WTRU 1101. The IMS WTRU 1101 may receive media data via the IMS and IP-CAN. The Generic IP Client 1105 does not have an active IMS connection, but may be connected to the Internet 1106.

Figure 11B:
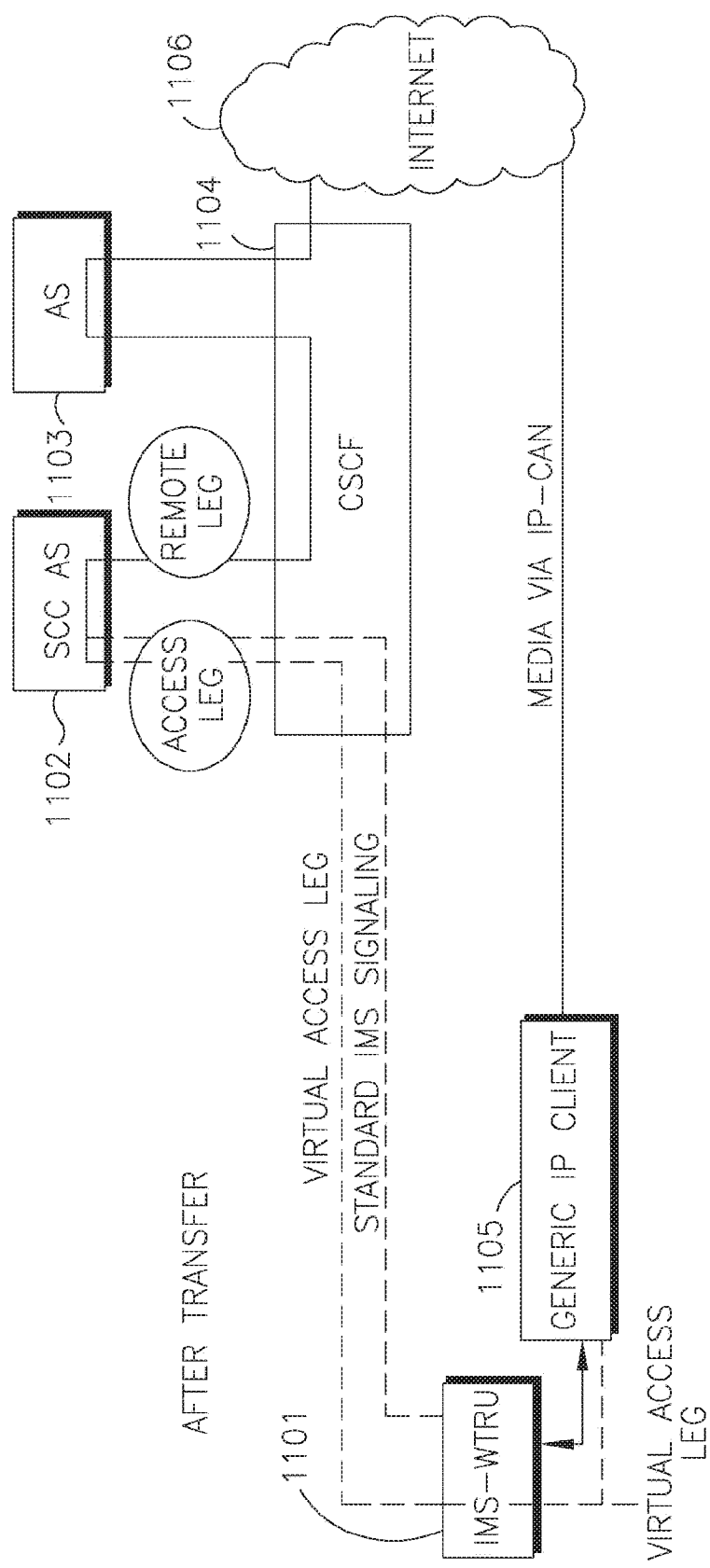
FIG. 11B is a second example architecture after HO of IMS session transfer from an IMS WTRU to a Generic IP Client utilizing a direct peer-to-peer connection.

FIG. 11B shows a second example architecture after HO of IMS session transfer from IMS WTRU 1101 to a Generic IP Client utilizing a direct peer-to-peer connection. In this example, the IMS WTRU 1101 may maintain a connection to the CSCF 1104. The SCC AS 1102 may be connected to the IMS WTRU 1101 via an additional access leg, through the CSCF 1104. The Generic IP Client 1105 is connected to the Internet 1106 for media data via IP-CAN. The Generic IP Client 1105 is also connected to the IMS WTRU 1101 in a peer-to-peer manner via a virtual access leg. The connection between the Generic IP Client 1105 and the IMS WTRU 1101 may be any type of peer-to-peer connection including, for example, IP, Bluetooth, and IEEE 802 based protocols (including Wi-Fi). The IMS WTRU 1101 acts as an IMS proxy for the Generic IP Client 1105. The IMS WTRU 1101 presents the Generic IP Client 1105 as an IMS device, forwarding signaling on its behalf.

Figure 12:
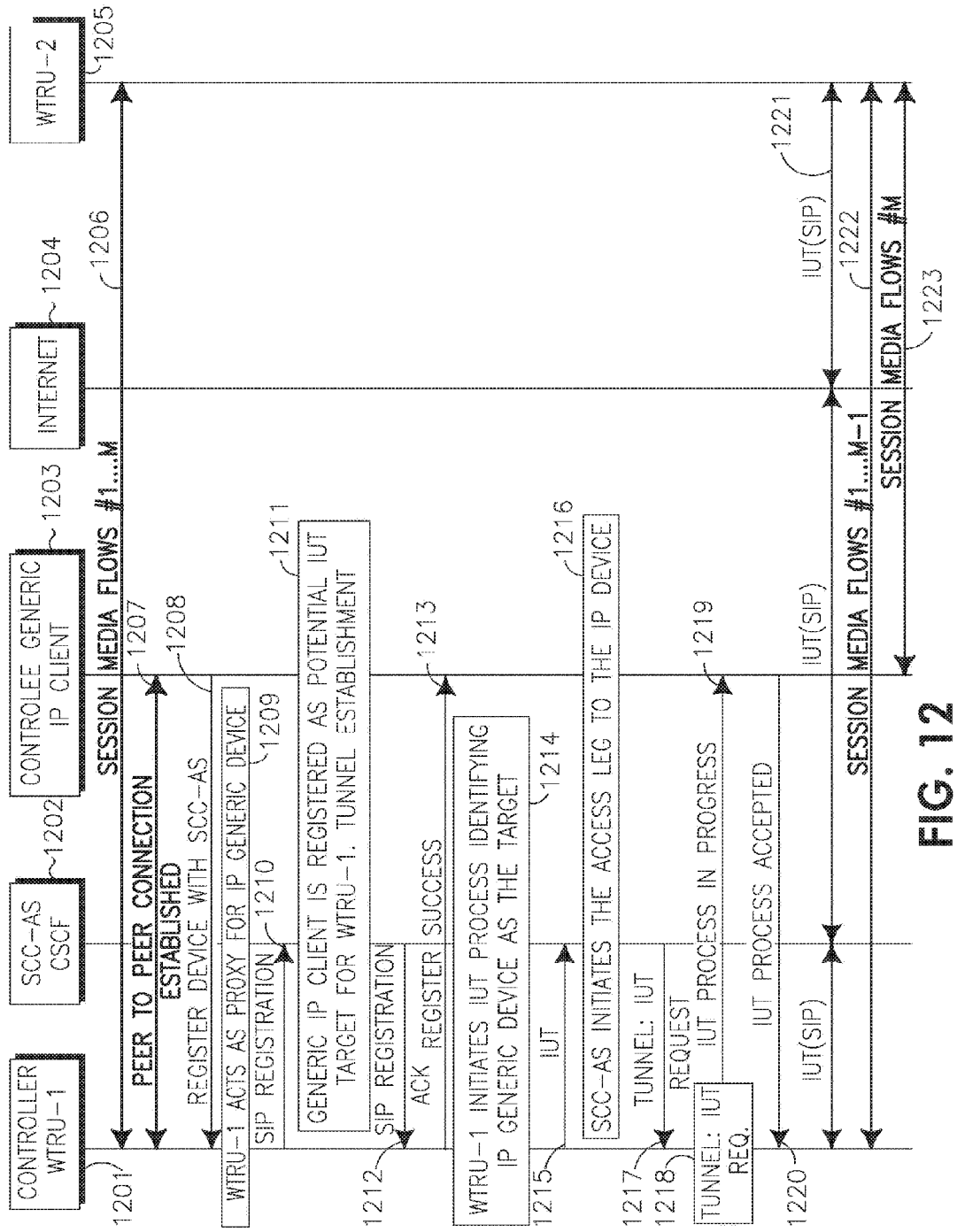
FIG. 12 is an example call flow for an IUT using architecture of FIGS. 11A-B.

FIG. 12 shows an example call flow for an IUT of an IMS session using the direct peer-to-peer architecture described in FIGS. 11A-B. Controller WTRU-1 1201 and WTRU-2 1205 may establish one or more media flows (session #1 . . . M) in step 1206. A peer-to-peer connection may be established between the Controller WTRU-1 1201 and the Controlee Generic IP Client 1203 in step 1207. The Controlee Generic IP Client 1203 may register with the SCC-AS 1202 via IP signaling in step 1208. The Controller WTRU-1 1201 may act as a proxy for the Controlee Generic IP Client 1203 in step 1209, as described above. Controller WTRU-1 1201 may establish SIP registration with the SCC-AS 1202 in step 1210. The Controlee Generic IP Client 1203 may register as a potential IUT target for the Controller WTRU-1 1201 and may establish a tunnel in step 1211. The SCC-AS 1202 may send a SIP registration ACK in step 1212. Controller WTRU-1 1201 may then send a register success message to the Controlee Generic IP Client 1203 in step 1213.

Controller WTRU-1 1201 may initiate an IUT process identifying the Controlee Generic IP Client 1203 as the target in step 1214. The IUT process is initiated in step 1215 and may include information regarding the target device and the flow ID. The SCC-AS 1202 may initiate the access leg to the Controlee Generic IP Client 1203 in step 1216. The SCC-AS 1202 may send an IUT message requesting a tunnel to the Controller WTRU-1 1201 in step 1217. The Controller WTRU-1 1201 may receive the IUT message in step 1218. The Controller WTRU-1 1201 may send an IUT process in progress message to the Controlee Generic IP Client 1203 at step 1219. The Controlee Generic IP Client 1203 may send an IUT process accepted message to the Controller WTRU-1 1201 at step 1220. An IUT message including Media, Capability negotiation, End point ID, or Port information, which may be a SIP message, may be sent from the Controller WTRU-1 1201 to the SCC-AS 1202, from the SCC-AS 1202 to the Internet 1204, and from the Internet 1204 to WTRU-2 1205 in step 1221. Controller WTRU-1 1201 may establish media flows (session #1 . . . M−1) with WTRU-2 1205 in step 1222. The Controlee Generic IP Client 1203 may establish media flows (session #M) with the WTRU-2 1205 in step 1223.

At any point in the method of FIG. 12, additional actions may be performed between the Controller WTRU 1201, SCC AS 1202, Controlee Generic IP Client 1203, Internet 1204, and WTRU-2 1205 according to IMS IUT processes. Upon completion of the embodiment shown in FIG. 12, the Controlee Generic IP Client 1203 and the Controller WTRU 1201 may participate in a collaborative session or the session may have been transferred to the Controller WTRU 1201.

Figure 13A:
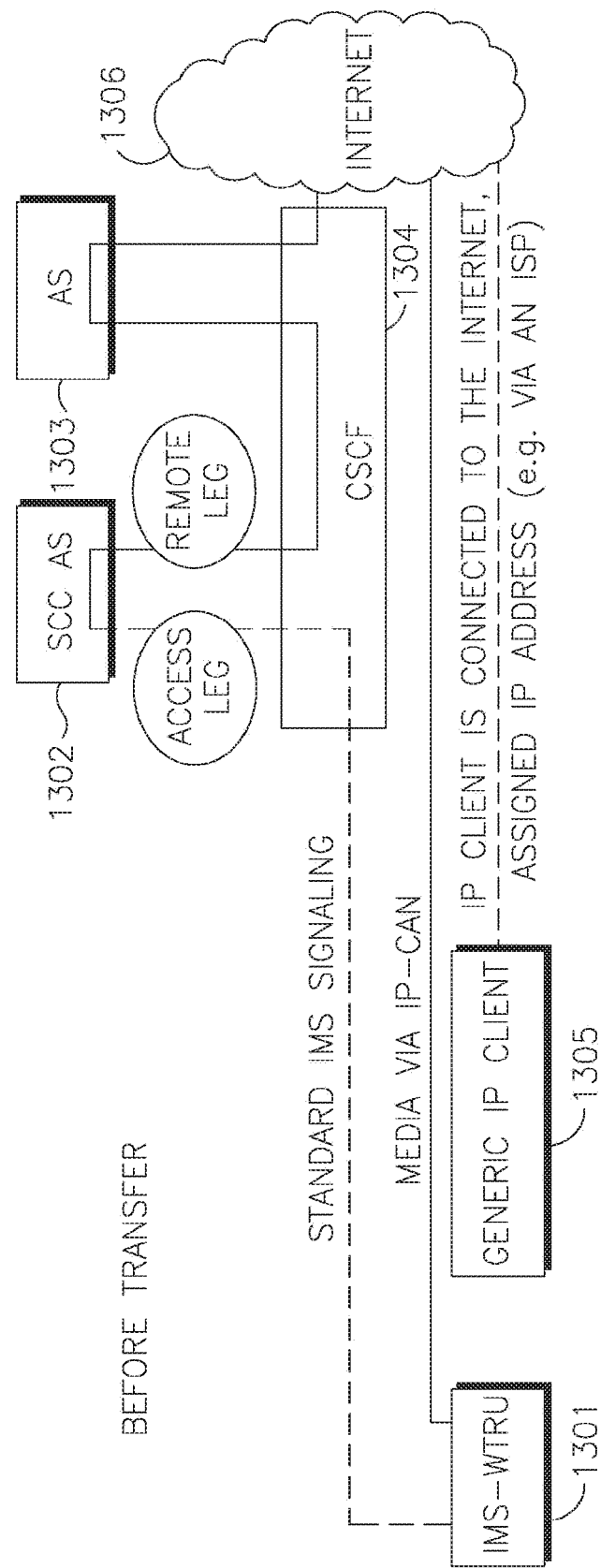
FIG. 13A depicts an example of an IP peer-to-peer architecture using the Internet prior to handover.

FIG. 13A shows an example of an IP peer-to-peer architecture using the Internet prior to HO. In this example, all connections are identical to those shown and described in FIG. 11A above.

Figure 13B:
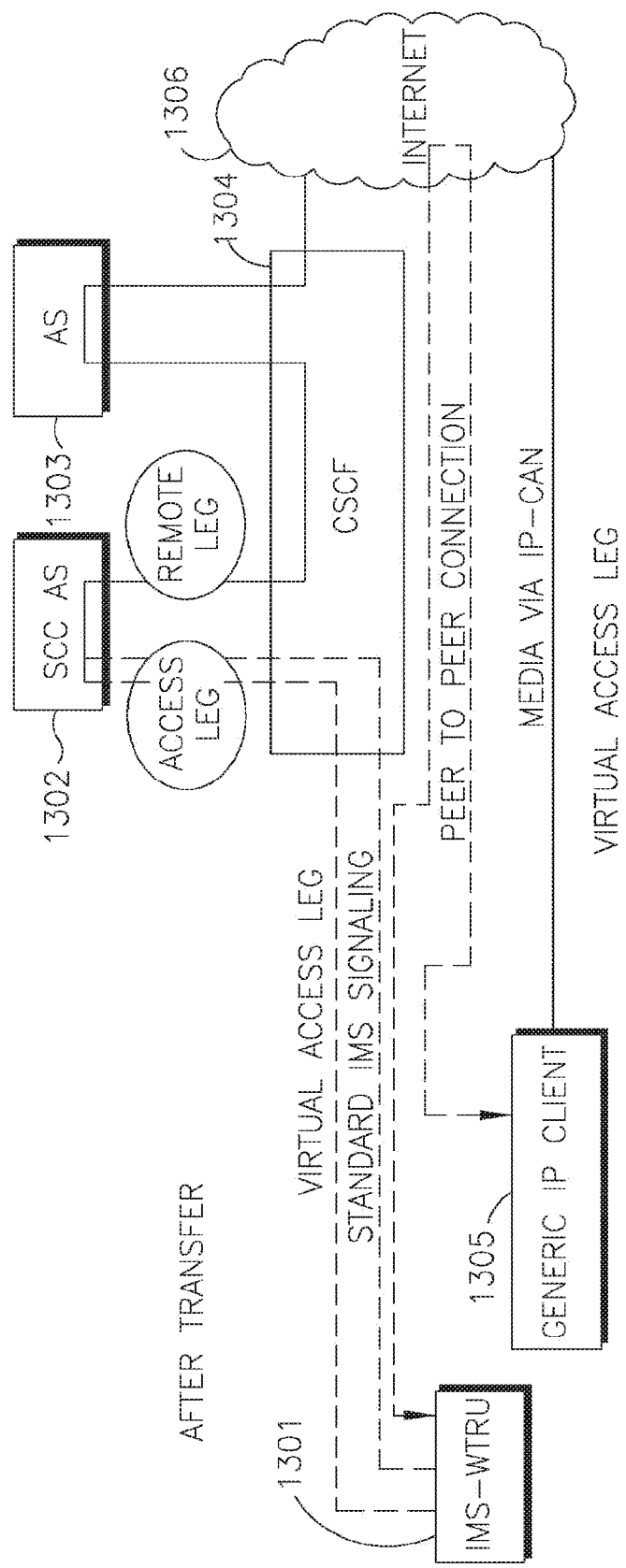
FIG. 13B depicts an example of an IP peer-to-peer architecture using the Internet after handover.

FIG. 13B shows an example architecture of an IP peer-to-peer architecture using the Internet after HO. In this example, the IMS WTRU 1301 may maintain a connection to the CSCF 1304. The SCC AS 1302 may be connected to the IMS-WTRU 1301 via an additional virtual access leg through the CSCF 1304. The Generic IP Client 1305 is connected to the Internet 1306 for media data via the IP-CAN. A peer-to-peer connection is established between the IMS-WTRU 1301 and the Generic IP Client 1305. The Generic IP Client 1305 and the IMS WTRU signal directly with each other via the IMS WTRU 1301 acting as an IMS proxy, via the Internet 1306, for the Generic IP Client 1305. The IMS WTRU 1301 presents the Generic IP Client 1305 as an IMS device. The IMS WTRU 1301 translates signals to a protocol supported by the Generic IP Client 1305 and forwards signals on the Generic IP Client's 1305 behalf.

Figure 14:
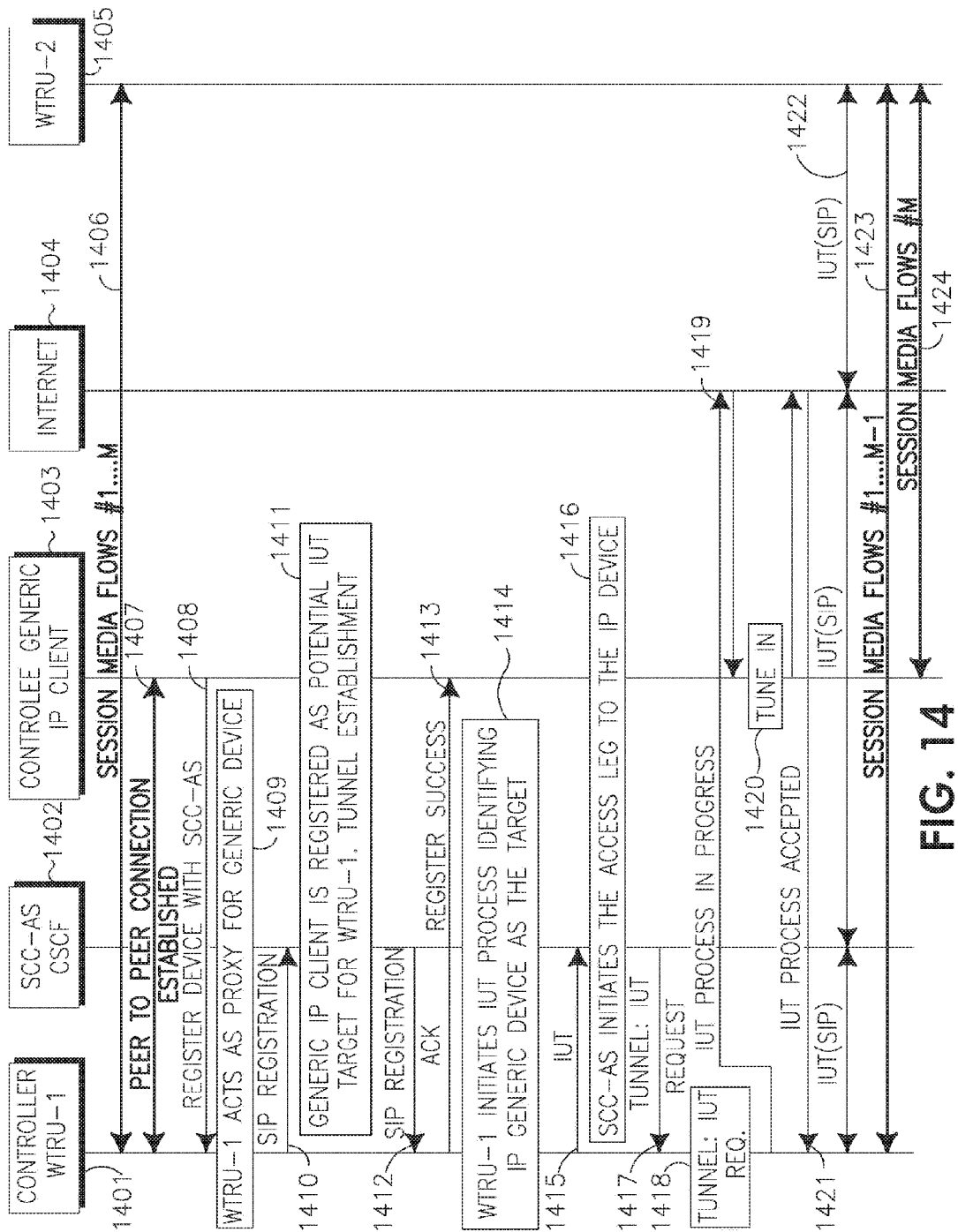
FIG. 14 is an example call flow for an IUT using the architecture of FIGS. 13A-B.

FIG. 14 shows an example call flow for an IUT of an IMS session using the architecture described in FIGS. 13A-B.

Controller WTRU-1 1402 and WTRU-2 1405 may establish one or more media flows (session #1 . . . M) in step 1406. A peer-to-peer connection may be established between the Controller WTRU-1 1401 and the Controlee Generic IP Client 1403 in step 1407. The Controlee Generic IP Client 1403 may register with the SCC-AS 1402 via IP signaling in step 1408. Controller WTRU-1 1401 may now act as a proxy for the Controlee Generic IP Client 1403 in step 1409. Controller WTRU-1 1401 may establish SIP registration with the SCC-AS 1402 in step 1410. The Controlee Generic IP Client 1403 may register as a potential IUT target for the Controller WTRU-1 1401 and a tunnel may be established in step 1411. The SCC-AS 1402 may send a SIP registration ACK to controller WTRU-1 1401 in step 1412. Controller WTRU-1 1401 may register success to the Controlee Generic IP Client 1403 in step 1413.

Controller WTRU-1 1401 may initiate the IUT process identifying the Controlee Generic IP Client 1403 as the target in step 1414. An IUT message for session transfer request may be sent from the Controller WTRU-1 1401 to SCC-AS 1402 including information about the target device and the flow identifier (ID) in step 1415. The SCC-AS 1402 may initiate the access leg to the Controlee Generic IP Client 1403 in step 1416. The SCC-AS 1402 may send an IUT request for a tunnel to the Controller WTRU-1 1401 including information about the target device and flow ID in step 1417. Controller WTRU-1 1401 may receive the IUT request for a tunnel in step 1418. Controller WTRU-1 1401 may send an IUT process in progress message to the Internet 1404 in step 1419. The Internet 1404 may request the Controlee Generic IP Client 1403 to tune in and accept all the media information for the Controller WTRU-1 1401 and WTRU-2 1405 in step 1420. The IUT process message, sent from the Controller WTRU-1 1401 to the Internet 1404, may be accepted by the Internet 1404 in step 1421. An IUT message, which may be a SIP message, may be sent from the Controller WTRU-1 1401 to the SCC-AS 1402, from SCC-AS 1402 to the Internet 1404, and from the Internet 1404 to WTRU-2 1405 in step 1422. Controller WTRU-1 1401 may establish media flows (session #1 . . . M−1) with WTRU-2 1405 in step 1423. The Controlee Generic IP Client 1403 may establish media flows (session #M) with the WTRU-2 1405 in step 1424.

At any point in the method of FIG. 14, additional actions may be performed between the Controller WTRU 1401, SCC AS 1402, Controlee Generic IP Client 1403, Internet 1404, and WTRU-2 1405 according to IMS IUT processes. Upon completion of the embodiment shown in FIG. 14, the Controlee Generic IP Client 1403 and the Controller WTRU 1401 may participate in a collaborative session or the session may have been transferred to the Controller WTRU 1401.

Figure 15:
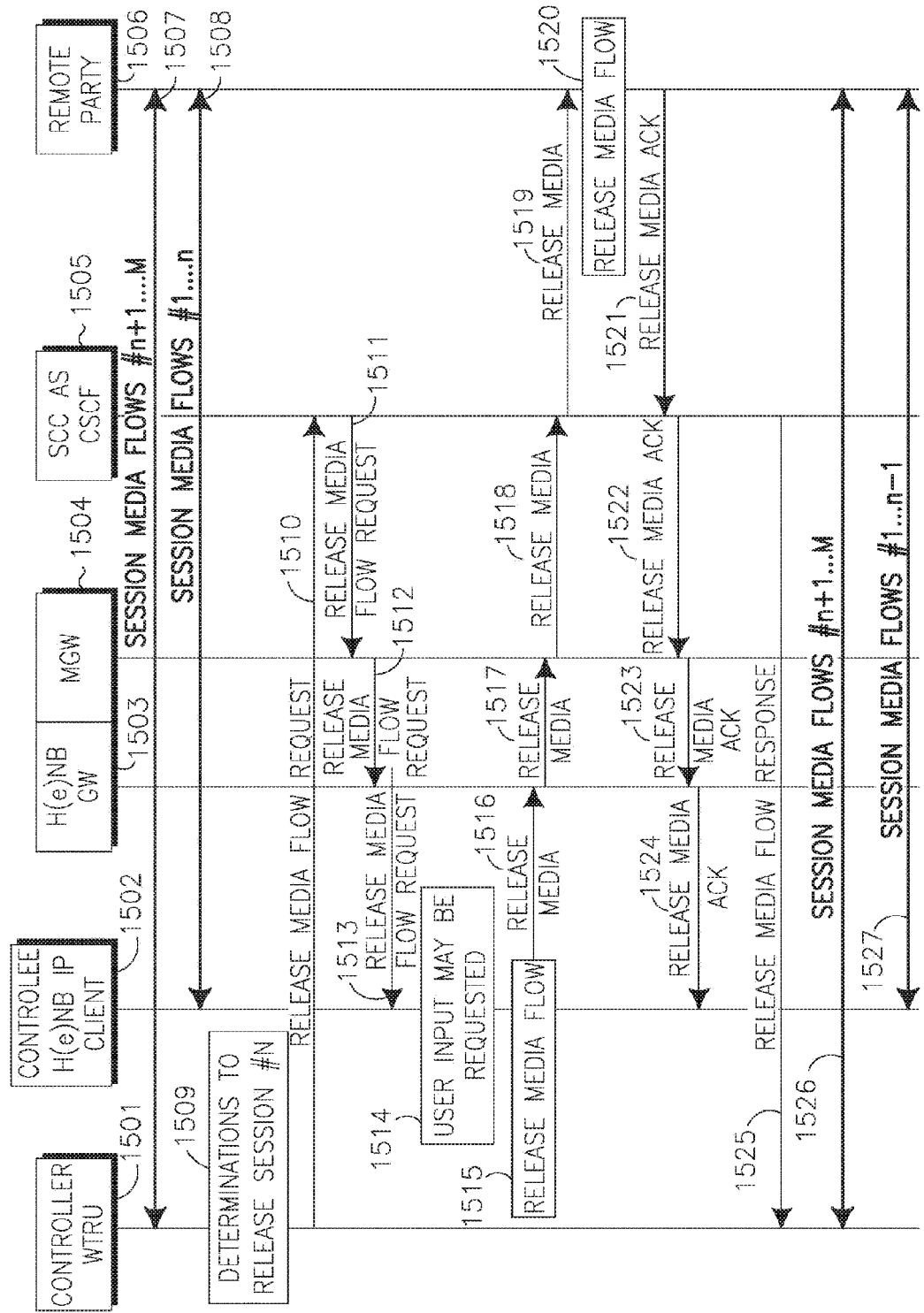
FIG. 15 is a first example of a method of collaborative session release initiated by a controller WTRU.

FIG. 15 shows an example of a media flow release within a collaborative IMS session between an IMS capable WTRU 1501 and a H(e)NB IP Client 1502, where the SCC AS 1505 is an anchor for the session release initiated by the IMS capable WTRU 1501 on the H(e)NB IP Client 1502. In this example the IMS capable WTRU 1501 is the controller and the H(e)NB IP Client 1502 is the controlee.

Controller WTRU 1501 and Remote Party 1506 may establish one or more media flows (session #n+1 . . . M) in step 1507. Controlee H(e)NB IP Client 1502 and Remote Party 1506 may establish one or more media flows (session #1 . . . n) in step 1508. The controller WTRU 1501 may determine to release session #n based on predetermined criteria, user profiles, user input, or any other mechanism in step 1509. The controller WTRU 1501 may send a release media flow request to the SCC AS 1505 including information about media flow #n and the target WTRU in step 1510. The SCC AS 1505 may send a release media flow request to the MGW 1504 in step 1511. The MGW 1504 may in turn send a release media flow request to a H(e)NB GW 1503 in step 1512. The H(e)NB GW 1503 may in turn send a release media flow request to the controlee H(e)NB IP Client 1502 in step 1513. The controlee H(e)NB IP Client 1502 may request a user input such as a confirmation or predetermined factors in step 1514. The controlee H(e)NB IP Client 1502 may release media flow in step 1515. The controlee H(e)NB IP Client 1502 may send a release media message to the H(e)NB GW 1503 in step 1516. The H(e)NB GW 1503 may in turn send a release media message to the MGW 1504 in step 1517. The MGW 1504 may in turn send a release media message to the SCC AS 1505 in step 1518. The SCC AS 1505 may in turn send a release media message to the Remote Party 1506 in step 1519. The Remote Party 1506 may the release media flow in step 1520. The Remote Party 1506 may send a release media ACK to the SCC AS 1505 in step 1521. The SCC AS 1505 may in turn send a release media ACK to the MGW 1504 in step 1522. The MGW 1504 may in turn send a release media ACK to the H(e)NB GW 1503 in step 1523. The H(e)NB GW 1503 may in turn send a release media ACK to the controlee H(e)NB IP Client 1502 in step 1524. The SCC AS 1505 may send a release media flow response to the controller WTRU 1501 in step 1525. The controller WTRU 1501 may establish media flows (session #n+1 . . . M) with the Remote Party 1506 in step 1526. The controlee H(e)NB IP Client 1502 may establish (session #1 . . . n−1) with the Remote Party 1506 media flows in step 1527.

At any point in the method of FIG. 15, additional actions may be performed between the controller WTRU 1501, controlee H(e)NB IP Client 1502, H(e)NB GW 1503, MGW 1504, SCC AS 1505, and Remote Party 1506 according to IMS IUT processes. Upon completion of the embodiment shown in FIG. 15, the controlee H(e)NB IP Client 1502 and the controller WTRU 1501 may participate in a collaborative session or the session may have been transferred to the controller WTRU 1501.

Figure 16:
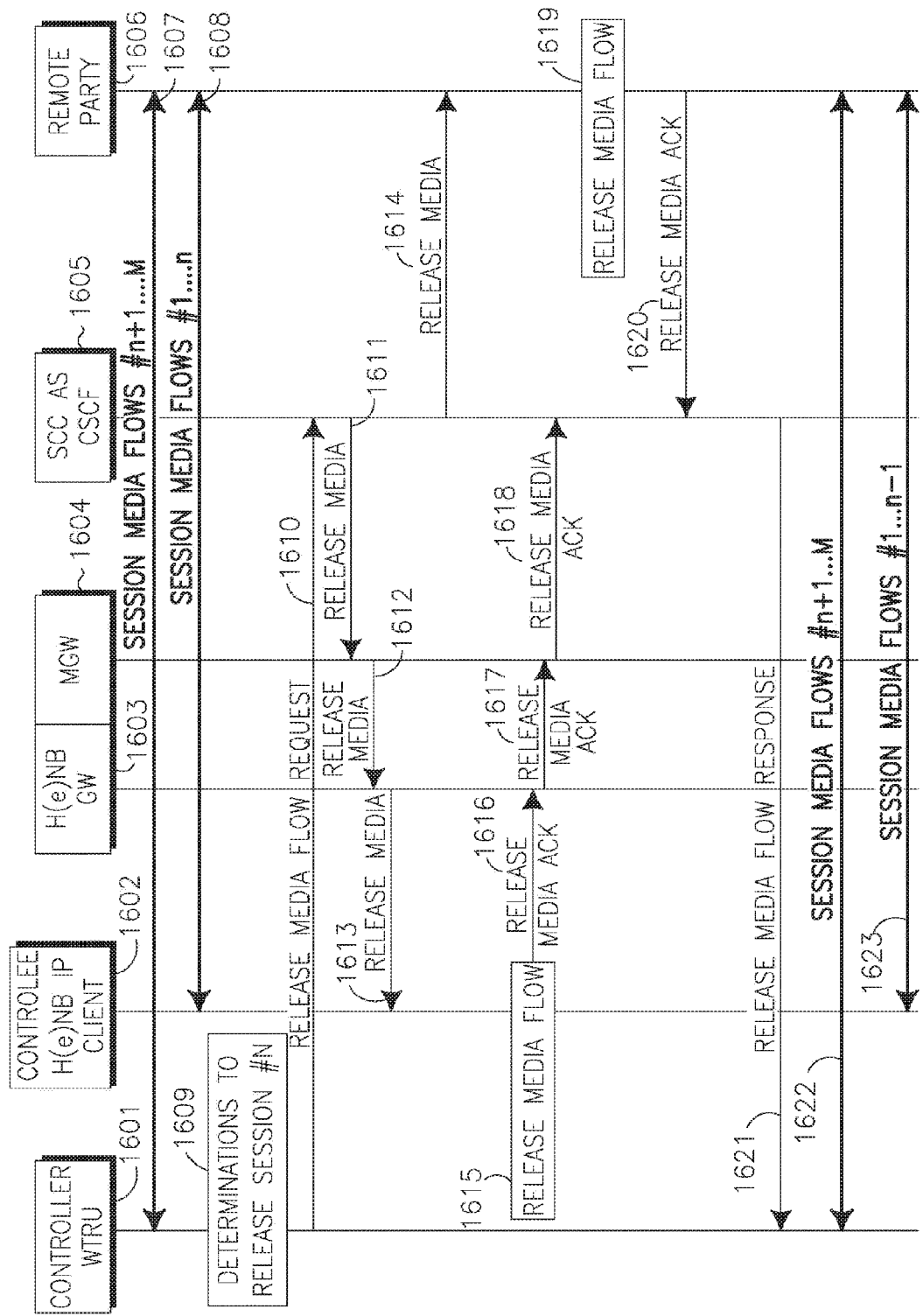
FIG. 16 is a second example of a method of collaborative session release initiated by a controller WTRU.

FIG. 16 shows a second example of a media flow release within a collaborative IMS session between an IMS capable WTRU 1601 and a H(e)NB IP Client 1602, where the SCC AS 1605 is an anchor for the session release initiated by the IMS capable WTRU 1601 on the H(e)NB IP Client 1602. In this example the IMS capable WTRU 1601 is the controller and the H(e)NB IP Client 1602 is the controlee.

Controller WTRU 1601 and Remote Party 1606 may establish one or more media flows (session #n+1 . . . M) in step 1607. Controlee H(e)NB IP Client 1602 and Remote Party 1606 may establish one or more media flows (session #1 . . . n) in step 1608. The controller WTRU 1601 may determine to release session #n based on predetermined criteria, user profiles, user input, or any other mechanism in step 1609. The controller WTRU 1601 may send a release media flow request to the SCC AS 1605 including information about media flow #n and the target WTRU in step 1610. The SCC AS 1605 may send a release media request to both the MGW 1604 and the Remote Party 1606 (which can be executed in any order) in steps 1611 and 1614. The MGW 1604 may in turn send a release media request to the H(e)NB GW 1603 in step 1612. The H(e)NB GW 1603 may in turn send a release media request to the controlee H(e)NB IP Client 1602 in step 1613. The controlee H(e)NB IP Client 1602 may release media flow in step 1615. The controlee H(e)NB IP Client 1602 may send a release media ACK to the H(e)NB GW 1603 in step 1616. The H(e)NB GW 1603 may in turn send a release media ACK to the MGW 1604 in step 1617. The MGW 1604 may in turn send a release media ACK to the SCC AS 1605 in step 1618. The Remote Party 1606 may also release media flow in step 1619. The Remote Party 1606 may send a release media ACK to the SCC AS 1605 in step 1620. The SCC AS 1605 may send a release media flow response to the controller WTRU 1601 in step 1621. The controller WTRU 1601 may establish media flows (session #n+1 ... M) with the Remote Party 1606 in step 1622. The controlee H(e)NB IP Client 1602 may establish media flows (session #1 ... n−1) with the Remote Party 1606 in step 1623.

At any point in the method of FIG. 16, additional actions may be performed between the controller WTRU 1601, controlee H(e)NB IP Client 1602, H(e)NB GW 1603, MGW 1604, SCC AS 1605, and Remote Party 1606 according to IMS IUT processes. Upon completion of the embodiment shown in FIG. 16, the controlee H(e)NB IP Client 1602 and the controller WTRU 1601 may participate in a collaborative session or the session may have been transferred to the controller WTRU 1601.

Figure 17:
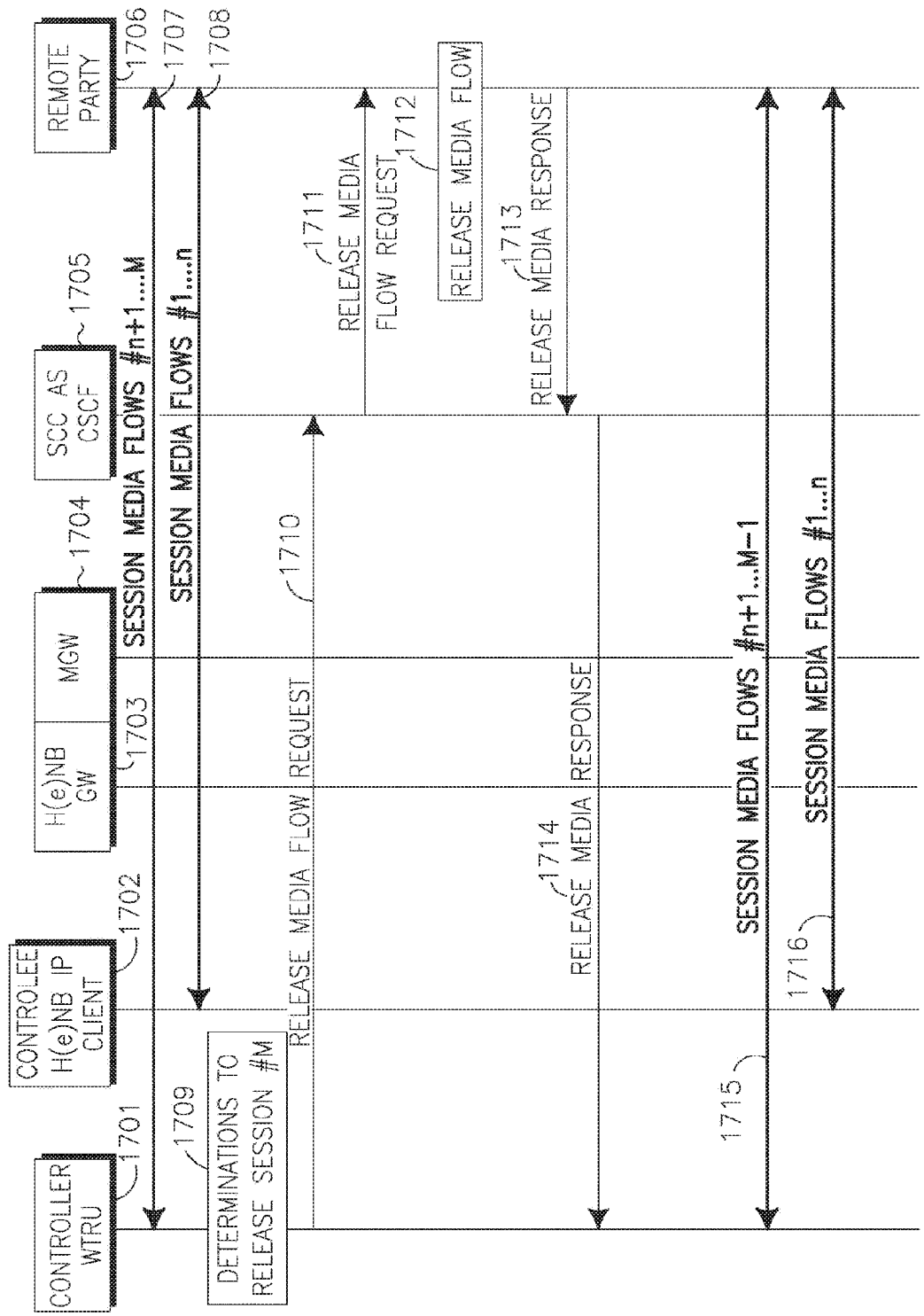
FIG. 17 is a third example of a method of collaborative session release initiated by a controller WTRU.

FIG. 17 shows an example of a media flow release within a collaborative IMS session between an IMS capable WTRU 1701 and a H(e)NB IP Client 1702, where the SCC AS 1705 is an anchor for the session release initiated by the IMS capable WTRU 1701 on itself. In this example the IMS capable WTRU 1701 is the controller and the H(e)NB IP Client 1702 is the controlee.

Controller WTRU 1701 and Remote Party 1706 may establish one or more media flows (session #n+1 ... M) in step 1707. Controlee H(e)NB IP Client 1702 and Remote Party 1706 may establish one or more media flows (session #1 ... n) in step 1708. The controller WTRU 1701 may determine to release session #M based on predetermined criteria, user profiles, user input, or any other mechanism in step 1709. The controller WTRU 1701 may send a release media flow request to the SCC AS 1705 including information about media flow #M and the target WTRU in step 1710. The SCC AS 1705 may send a release media flow request to the Remote Party 1706 in step 1711. The Remote Party 1706 may release media flow in step 1712. The Remote Party 1706 may send a release media response to the SCC AS 1705 in step 1713. The SCC AS 1705 may in turn send a release media response to the controller WTRU 1701 in step 1714. The controller WTRU 1701 may establish media flows (session #n+1 ... M−1) with the Remote Party 1706 in step 1715. The controlee H(e)NB IP Client 1702 may establish media flows (session #1 ... n) with the Remote Party 1706 in step 1716.

At any point in the method of FIG. 17, additional actions may be performed between the controller WTRU 1701, controlee H(e)NB IP Client 1702, H(e)NB GW 1703, MGW 1704, SCC AS 1705, and Remote Party 1706 according to IMS IUT processes. Upon completion of the embodiment shown in FIG. 17, the controlee H(e)NB IP Client 1702 and the controller WTRU 1701 may participate in a collaborative session or the session may have been transferred to the controller WTRU 1701.

Figure 18:
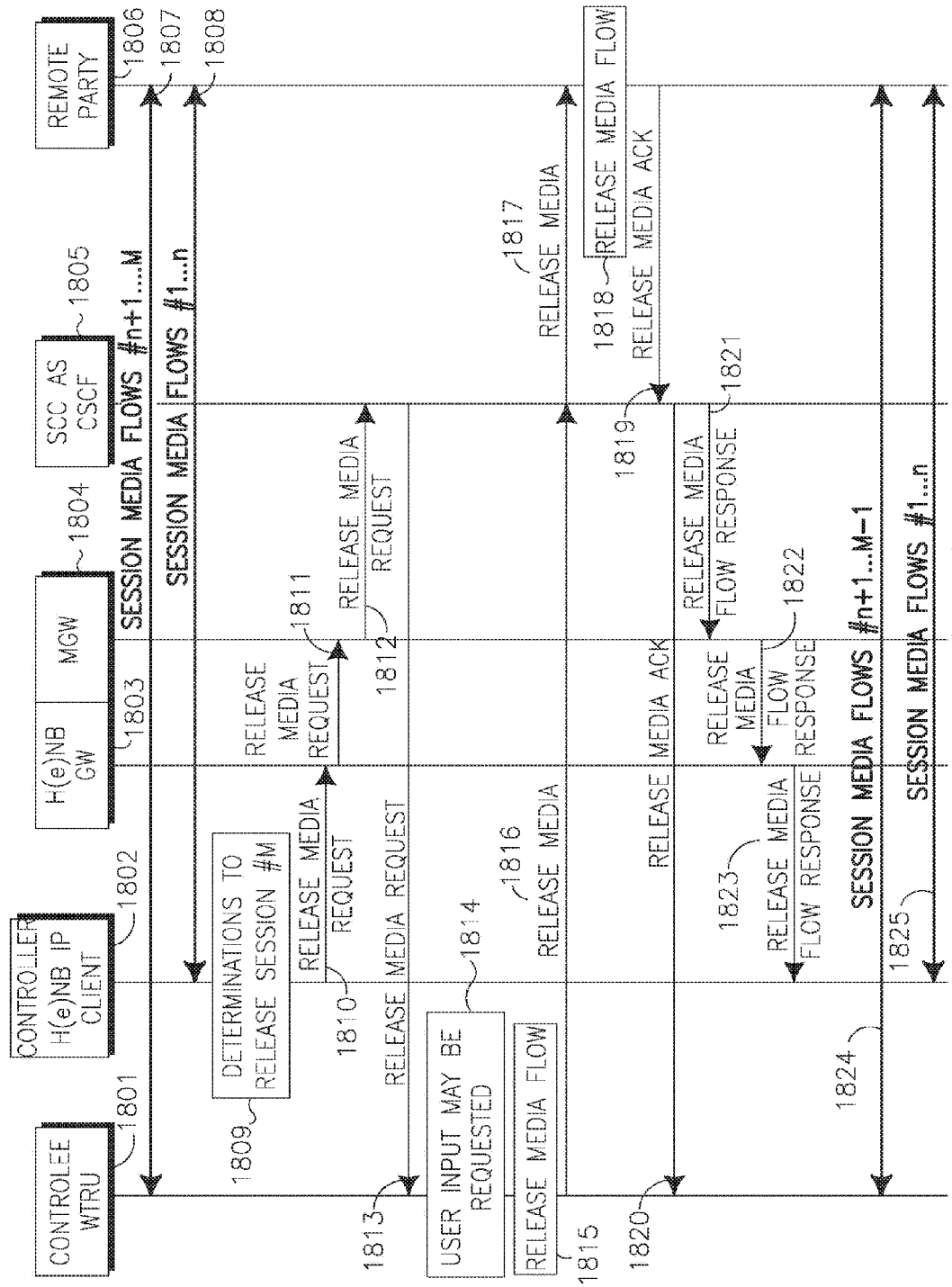
FIG. 18 is a first example of a method of collaborative session release initiated by a controller H(e)NB IP Client.

FIG. 18 shows an example of a media flow release within a collaborative IMS session between an IMS capable WTRU 1801 and a H(e)NB IP Client 1802, where the SCC AS 1805 is an anchor for the session release initiated by the H(e)NB IP Client 1802 on the IMS capable WTRU 1801. In this example the H(e)NB IP Client 1802 is the controller and the IMS capable WTRU 1801 is the controlee.

Controlee WTRU 1801 and Remote Party 1806 may establish one or more media flows (session #n+1 ... M) in step 1807. Controller H(e)NB IP Client 1802 and Remote Party 1806 may establish one or more media flows (session #1 ... n) in step 1808. The controller H(e)NB IP Client 1802 may determine to release session #M based on predetermined criteria, user profiles, user input, or any other mechanism in step 1809. The controller H(e)NB IP Client 1802 may send a release media request to the H(e)NB GW 1803 including information about media flow #M in step 1810. The H(e)NB GW 1803 may in turn send a release media request to the MGW 1804 in step 1811. The MGW 1804 may in turn send a release media request to the SCC AS 1805 in step 1812. The SCC AS 1805 may send a release media request to the controlee WTRU 1801 in step 1813. The controlee WTRU 1801 may request user input such as a confirmation or predetermined factors at step 1814. The controlee WTRU 1801 may release media flow in step 1815. The controlee WTRU 1801 may send a release media request to the SCC AS 1805 in step 1816. The SCC AS 1805 may in turn send a release media request to the Remote Party 1806 in step 1817. The Remote Party 1806 may release media flow in step 1818. The Remote Party 1806 may send a release media ACK to the SCC AS 1805 in step 1819. The SCC AS 1805 may in turn send a release media ACK to the controlee WTRU 1801 in step 1820. The SCC AS 1805 may send a release media flow response to the MGW 1804 in step 1821. The MGW 1804 may in turn send a release media flow response to the H(e)NB GW 1803 in step 1822. The H(e)NB GW 1803 may in turn send a release media flow response to the controller H(e)NB IP Client 1802 in step 1823. The controlee WTRU 1801 may establish media flows (session #n+1 ... M−1) with the Remote Party 1806 in step 1824. The controller H(e)NB IP Client 1802 may establish media flows (session #1 ... n) with the Remote Party 1806 in step 1825.

At any point in the method of FIG. 18, additional actions may be performed between the controlee WTRU 1801, controller H(e)NB IP Client 1802, H(e)NB GW 1803, MGW 1804, SCC AS 1805, and Remote Party 1806 according to IMS IUT processes. Upon completion of the embodiment shown in FIG. 18, the controller H(e)NB IP Client 1802 and the controlee WTRU 1801 may participate in a collaborative session or the session may have been transferred to the controlee WTRU 1801.

Figure 19:
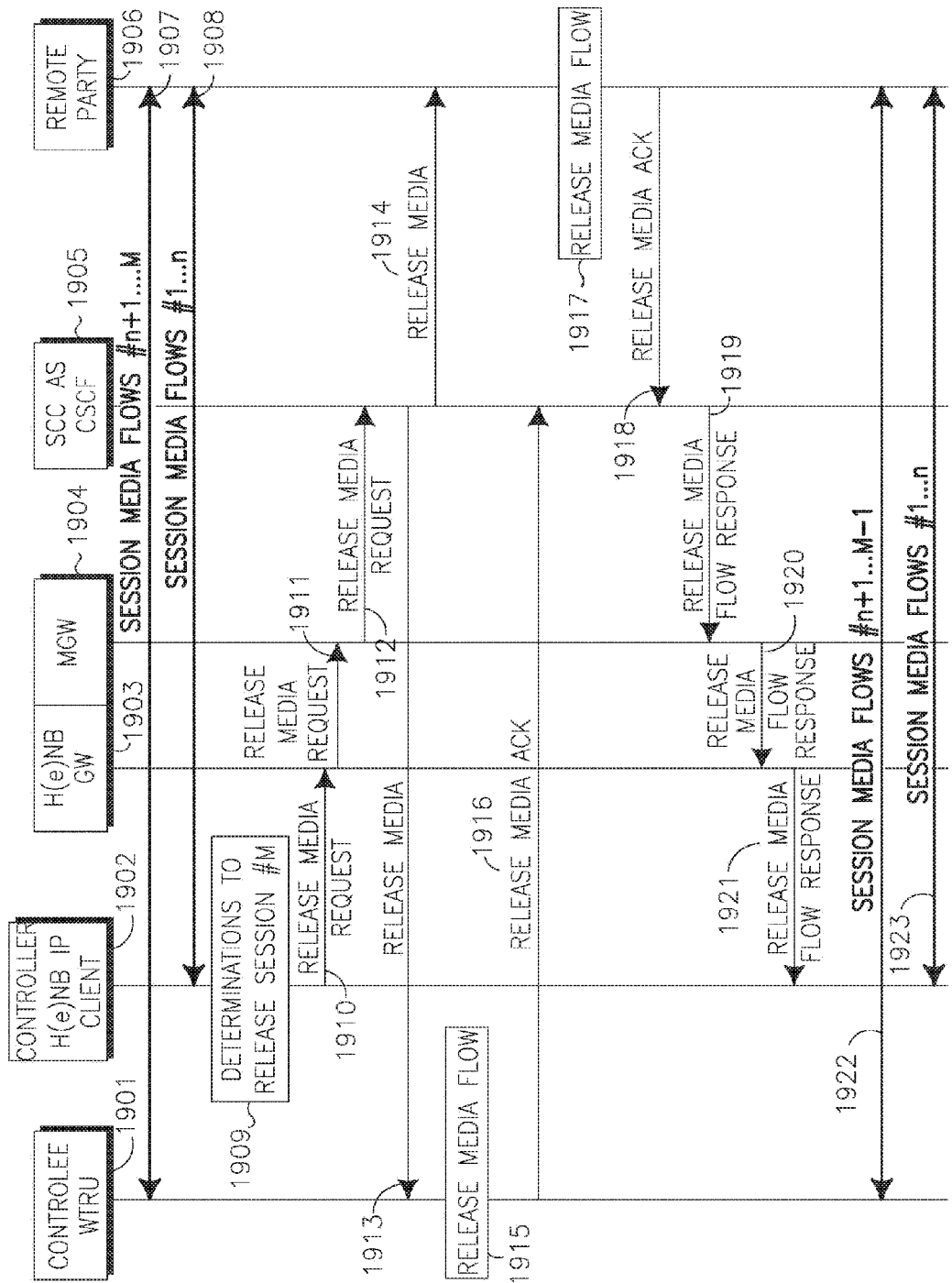
FIG. 19 is a second example of a method of collaborative session release initiated by a controller H(e)NB IP Client.

FIG. 19 shows a second example of a media flow release within a collaborative IMS session between an IMS capable WTRU 1901 and a H(e)NB IP Client 1902, where the SCC AS 1905 is an anchor for the session release initiated by the H(e)NB IP Client 1902 on the IMS capable WTRU 1901. In this example the H(e)NB IP Client 1902 is the controller and the IMS capable WTRU 1901 is the controlee.

Controller WTRU 1901 and Remote Party 1906 may establish one or more media flows (session #n+1 ... M) in step 1907. Controlee H(e)NB IP Client 1902 and Remote Party 1906 may establish one or more media flows (session #1 ... n) in step 1908. The controller H(e)NB IP Client 1902 may determine to release session #M based on predetermined criteria, user profiles, user input, or any other mechanism in step 1909. The controller H(e)NB IP Client 1902 may send a release media request to the H(e)NB GW 1903 including information about media flow #M in step 1910. The H(e)NB GW 1903 may in turn send a release media request to the MGW 1904 in step 1911. The MGW 1904 may in turn send a release media request to the SCC AS 1905 in step 1912. The SCC AS 1905 may send a release media request to both the controlee WTRU 1901 and the Remote Party 1906 (which can be executed in any order) in step 1913 and 1914. The controlee WTRU 1901 may release media flow in step 1915. The controlee WTRU 1901 may send a release media ACK to the SCC AS 1905 in step 1916. The Remote Party 1906 may release media flow in step 1917. The Remote Party 1906 may send a release media ACK to the SCC AS 1905 in step 1918. The SCC AS 1905 may send a release media flow response to the MGW 1904 in step 1919. The MGW 1904 may in turn send a release media flow response to the H(e)NB GW 1903 in step 1920.

The H(e)NB GW 1903 may in turn send a release media flow response to the controller H(e)NB IP Client 1902 in step 1921. The controlee WTRU 1901 may establish media flows (session #n+1 . . . M−1) with the Remote Party 1906 in step 1922. The controller H(e)NB IP 1902 Client may establish media flows (session #1 . . . n) with the Remote Party 1906 in step 1923.

At any point in the method of FIG. 19, additional actions may be performed between the controlee WTRU 1901, controller H(e)NB IP Client 1902, H(e)NB GW 1903, MGW 1904, SCC AS 1905, and Remote Party 1906 according to IMS IUT processes. Upon completion of the embodiment shown in FIG. 19, the controller H(e)NB IP Client 1902 and the controlee WTRU 1901 may participate in a collaborative session or the session may have been transferred to the controlee WTRU 1901.

Figure 20:
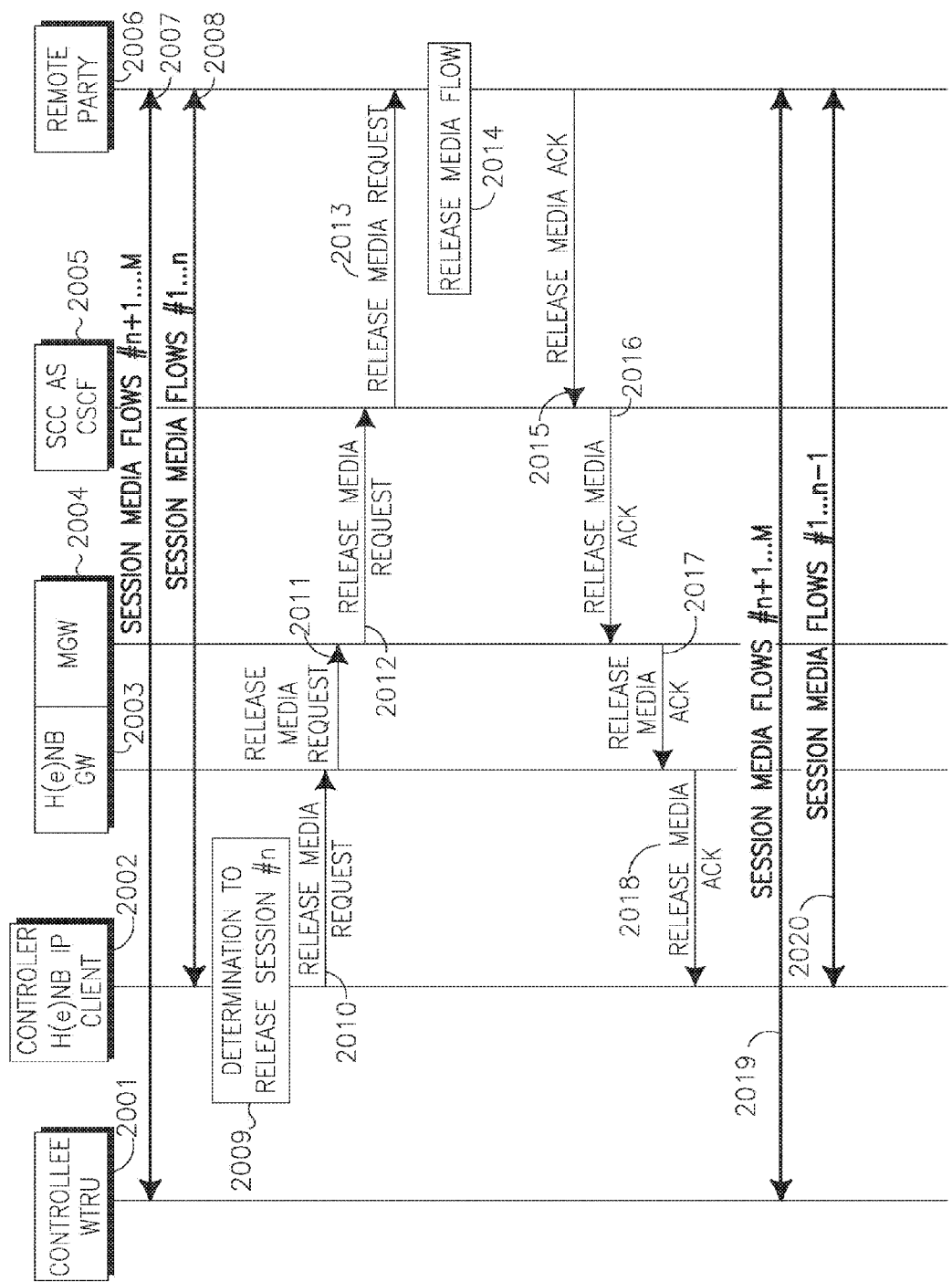
FIG. 20 is a third example of a method of collaborative session release initiated by a controller H(e)NB IP Client.

FIG. 20 shows an example of a media flow release within a collaborative IMS session between an IMS capable WTRU 2001 and a H(e)NB IP Client 2002, where the SCC AS 2005 is an anchor for the session release initiated by the H(e)NB IP Client 2002 on itself. In this example the H(e)NB IP Client 2002 is the controller and the IMS capable WTRU 2001 is the controlee.

Controlee WTRU 2001 and Remote Party 2006 may establish one or more media flows (session #n+1 . . . M) in step 2007. Controller H(e)NB IP Client 2002 and Remote Party 2006 may establish one or more media flows (session #1 . . . n) in step 2008. The controller H(e)NB IP Client 2002 may determine to release session #n based on predetermined criteria, user profiles, user input, or any other mechanism in step 2009. The controller H(e)NB IP Client 2002 may send a release media request to the H(e)NB GW 2003 including information about media flow #n in step 2010. The H(e)NB GW 2003 may in turn send a release media request to the MGW 2004 in step 2011. The MGW 2004 may in turn send a release media request to the SCC AS 2005 in step 2012. The SCC AS 2005 may in turn send a release media request to the Remote Party 2006 in step 2013. The Remote Party 2006 may release media flow in step 2014. The Remote Party 2006 may send a release media ACK to the SCC AS 2005 in step 2015. The SCC AS 2005 may in turn send a release media ACK to the MGW 2004 in step 2016. The MGW 2004 may in turn send a release media ACK to the H(e)NB GW 2003 in step 2017. The H(e)NB GW 2003 may in turn send a release media ACK to the controller H(e)NB IP Client 2002 in step 2018. The controlee WTRU 2001 may establish media flows (session #n+1 . . . M) with the Remote Party 2006 in step 2019. The controller H(e)NB IP Client 2002 may establish media flows (session #1 . . . n−1) with the Remote Party 2006 in step 2020.

At any point in the method of FIG. 20, additional actions may be performed between the controlee WTRU 2001, controller H(e)NB IP Client 2002, H(e)NB GW 2003, MGW 2004, SCC AS 2005, and Remote Party 2006 according to IMS IUT processes. Upon completion of the embodiment shown in FIG. 20, the controller H(e)NB IP Client 2002 and the controlee WTRU 2001 may participate in a collaborative session or the session may have been transferred to the controlee WTRU 2001.

Figure 21:
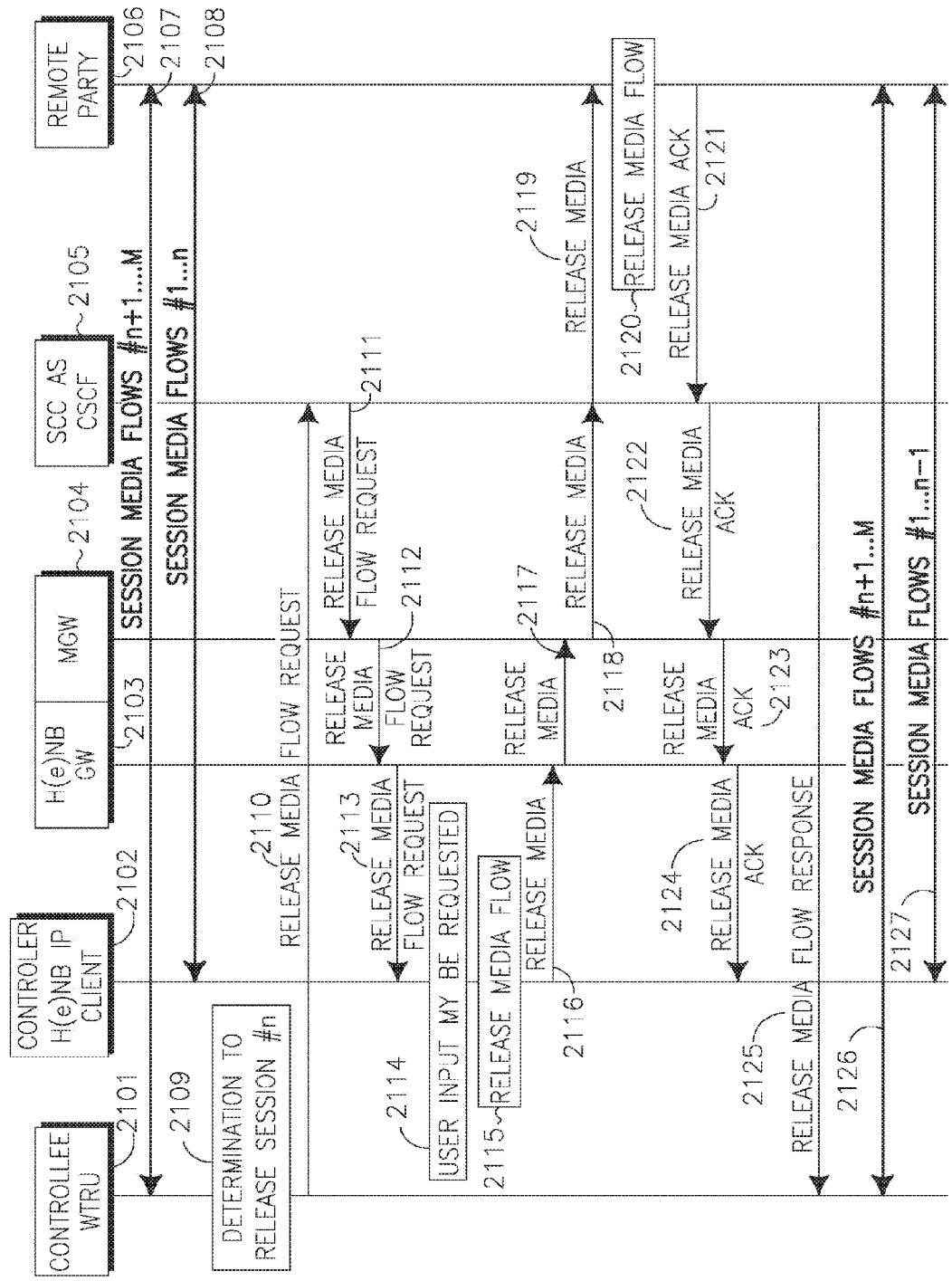
FIG. 21 is a first example of a method of collaborative session release initiated by a controlee WTRU.

FIG. 21 shows an example of a media flow release within a collaborative IMS session between an IMS capable WTRU 2101 and a H(e)NB IP Client 2102, where the SCC AS 2105 is an anchor for the session release initiated by the IMS capable WTRU 2101 on the H(e)NB IP Client 2102. In this example the IMS capable WTRU 2101 the controlee and the H(e)NB IP Client 2102 is the controller.

Controlee WTRU 2101 and Remote Party 2106 may establish one or more media flows (session #n+1 . . . M) in step 2107. Controller H(e)NB IP Client 2102 and Remote Party 2106 may establish one or more media flows (session #1 . . . n) in step 2108. The controlee WTRU 2101 may determine to release session #n based on predetermined criteria, user profiles, user input, or any other mechanism in step 2109. The controlee WTRU 2101 may send a release media flow request to the SCC AS 2105 including information about the media flow #n and target WTRU in step 2110. The SCC AS 2105 may send a release media flow request to the MGW 2104 in step 2111. The MGW 2104 may in turn send a release media flow request to the H(e)NB GW 2103 in step 2112. The H(e)NB GW 2103 may in turn send a release media flow request to the controller H(e)NB IP Client 2102 in step 2113. The controller H(e)NB IP Client 2102 may request user input in step 2114. The controller H(e)NB IP Client 2102 may release media flow in step 2115. The controller H(e)NB IP Client 2102 may send a release media request to the H(e)NB GW 2103 in step 2116. The H(e)NB GW 2103 may in turn send a release media request to the MGW 2104 in step 2117. The MGW 2104 may in turn send a release media request to the SCC AS 2105 in step 2118. The SCC AS 2105 may in turn send a release media request to the Remote Party 2016 in step 2119. The Remote Party 2106 may release media flow in step 2120. The Remote Party 2106 may send a release media ACK to the SCC AS 2105 in step 2121. The SCC AS 2105 may in turn send a release media ACK to the MGW 2104 in step 2122. The MGW 2104 may in turn send a release media ACK to the H(e)NB GW 2103 in step 2123. The H(e)NB GW 2103 may in turn send a release media ACK to the controller H(e)NB IP Client 2102 in step 2124. The SCC AS 2105 may send a release media flow response to the controlee WTRU 2101 in step 2125. The controlee WTRU 2101 may establish media flows (session #n+1 . . . M) with the Remote Party 2106 in step 2126. The controller H(e)NB IP Client 2102 may establish media flows (session #1 . . . n−1) with the Remote Party 2106 in step 2127.

At any point in the method of FIG. 21, additional actions may be performed between the controlee WTRU 2101, controller H(e)NB IP Client 2102, H(e)NB GW 2103, MGW 2104, SCC AS 2105, and Remote Party 2106 according to IMS IUT processes. Upon completion of the embodiment shown in FIG. 21, the controller H(e)NB IP Client 2102 and the controlee WTRU 2101 may participate in a collaborative session or the session may have been transferred to the controlee WTRU 2101.

Figure 22:
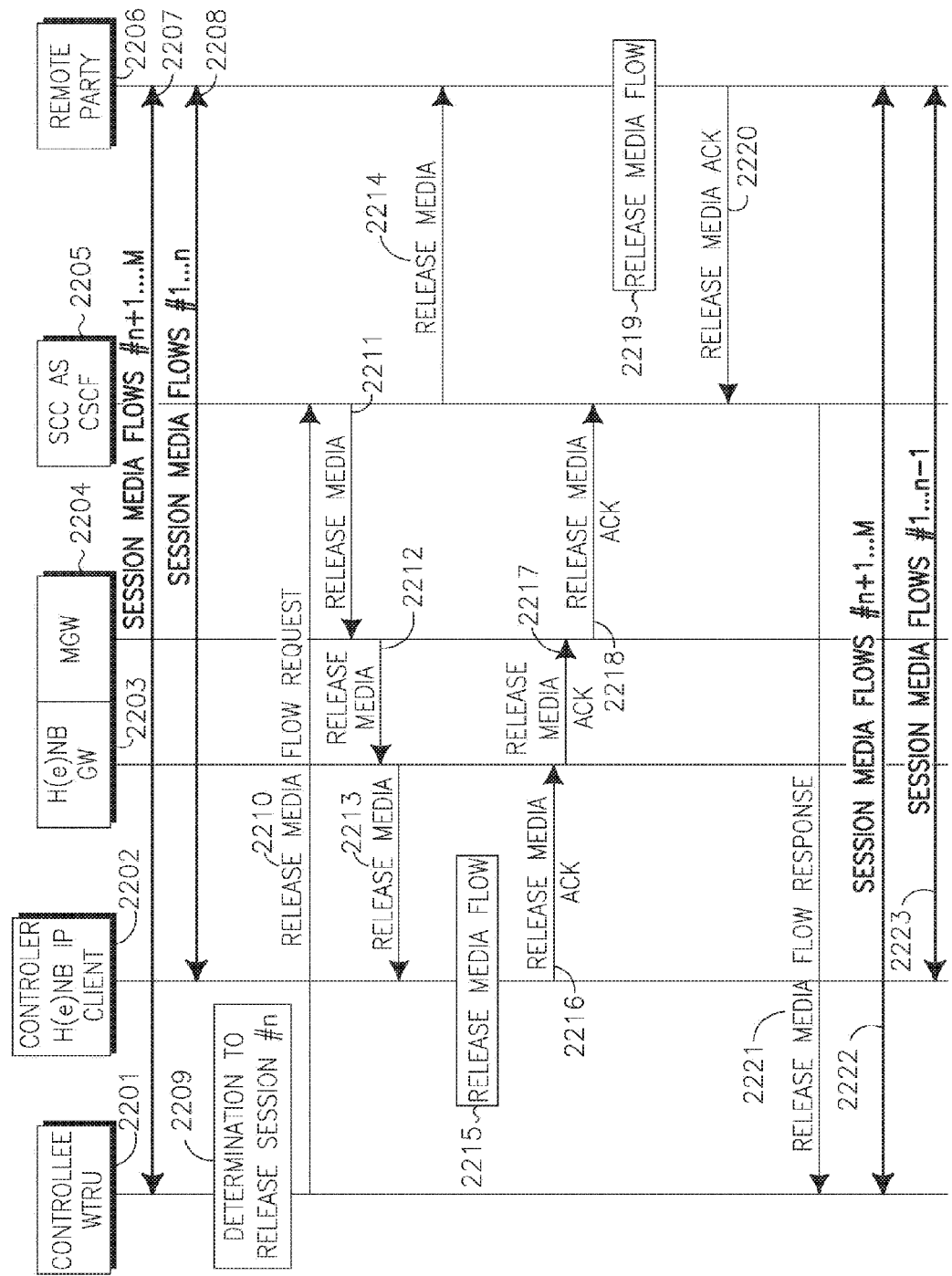
FIG. 22 is a second example of a method of collaborative session release initiated by a controlee WTRU.

FIG. 22 shows a second example of a media flow release within a collaborative IMS session between an IMS capable WTRU 2201 and a H(e)NB IP Client 2202, where the SCC AS 2205 is an anchor for the session release initiated by the IMS capable WTRU 2201 on the H(e)NB IP Client 2202. In this example the IMS capable WTRU 2201 the controlee and the H(e)NB IP Client 2202 is the controller.

Controlee WTRU 2201 and Remote Party 2206 may establish one or more media flows (session #n+1 . . . M) in step 2207. Controller H(e)NB IP Client 2202 and Remote Party 2206 may establish one or more media flows (session #1 . . . n) in step 2208. The controlee WTRU 2201 may determine to release session #n based on predetermined criteria, user profiles, user input, or any other mechanism in step 2209. The controlee WTRU 2201 may send a release media flow request to the SCC AS 2205 including information about the media flow #n and target WTRU in step 2210. The SCC AS 2205 may send a release media request to both the MGW 2204 and the Remote Party 2206 (which can be executed in any order) in steps 2211 and 2214. The MGW 2204 may in turn send a release media request to the H(e)NB GW 2203 in step 2212. The H(e)NB GW 2203 may in turn send a release media request to the controller H(e)NB IP Client 2202 in step 2213. The controller H(e)NB IP Client 2202 may release media flow in step 2215. The controller H(e)NB IP Client 2202 may send a release media ACK to the H(e)NB GW 2203 in step 2216. The H(e)NB GW 2203 may in turn send a release media ACK to the MGW 2204 in step 2217. The MGW 2204 may in turn send a release media ACK to the SCC AS 2205 in step 2218. The Remote Party 2206 may release media flow in step 2219. The Remote Party 2206 may send a release media ACK to the SCC AS 2205 in step 2220. The SCC AS 2205 may send a release media flow response to the controlee WTRU 2201 in step 2232. The controlee WTRU 2201 may establish media flows (session #n+1 . . . M) with the Remote Party 2206 in step 2222. The controller H(e)NB IP Client 2202 may establish media flows (session #1 . . . n−1) with the Remote Party 2206 in step 2223.

At any point in the method of FIG. 22, additional actions may be performed between the controlee WTRU 2201, controller H(e)NB IP Client 2202, H(e)NB GW 2203, MGW 2204, SCC AS 2205, and Remote Party 2206 according to IMS IUT processes. Upon completion of the embodiment shown in FIG. 22, the controller H(e)NB IP Client 2202 and the controlee WTRU 2201 may participate in a collaborative session or the session may have been transferred to the controlee WTRU 2201.

Figure 23:
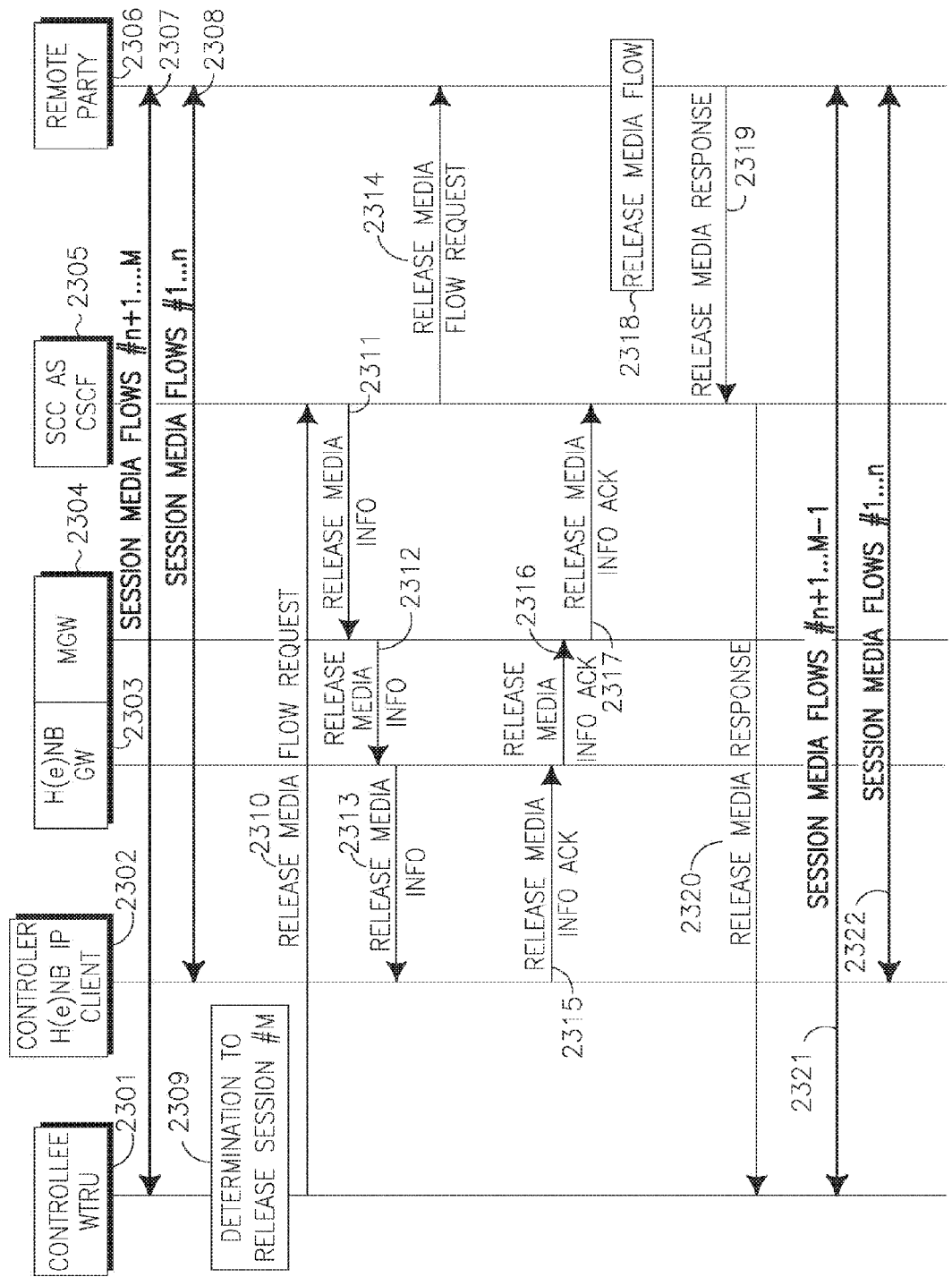
FIG. 23 is a third example of a method of collaborative session release initiated by a controlee WTRU.

FIG. 23 shows an example of a media flow release within a collaborative IMS session between an IMS capable WTRU 2301 and a H(e)NB IP Client 2302, where the SCC AS 2305 is an anchor for the session release initiated by the IMS capable WTRU 201 on itself. In this example the IMS capable WTRU 2301 the controlee and the H(e)NB IP Client 2302 is the controller.

Controlee WTRU 2301 and Remote Party 2306 may establish one or more media flows (session #n+1 . . . M) in step 2307. Controller H(e)NB IP Client 2302 and Remote Party 2306 may establish one or more media flows (session #1 . . . n) in step 2308. The controlee WTRU 2301 may determine to release session #M based on predetermined criteria, user profiles, user input, or any other mechanism in step 2309. The controlee WTRU 2301 may send a release media flow request to the SCC AS 2205 including information about the media flow #M and the target WTRU in step 2310. The SCC AS 2305 may send a release media info request to the MGW 2304 in step 2311. The MGW 2304 may in turn send a release media info request to the H(e)NB GW 2303 in step 2312. The H(e)NB GW 2303 may in turn send a release media info request to the controller H(e)NB IP Client 2302 in step 2313. The SCC AS 2305 may send a release media flow request to the Remote Party 2306 in step 2314. The controller H(e)NB IP Client 2302 may send a release media info ACK to the H(e)NB GW 2303 in step 2315. The H(e)NB GW 2303 may in turn send a release media info ACK to the MGW 2304 in step 2316. The MGW 2304 may in turn send a release media info ACK to the SCC AS 2305 in step 2317. The Remote Party 2306 may release media flow in step 2318. The Remote Party 2306 may send a release media response to the SCC AS 2305 in step 2319. The SCC AS 2305 may in turn send a release media response to the controlee WTRU 2301 in step 2320. The controlee WTRU 2301 may establish media flows (session #n+1 . . . M−1) with the Remote Party 2306 in step 2321. The controller H(e)NB IP Client 2302 may establish media flows (session #1 . . . n) with the Remote Party 2306 in step 2322.

At any point in the method of FIG. 23, additional actions may be performed between the controlee WTRU 2301, controller H(e)NB IP Client 2302, H(e)NB GW 2303, MGW 2304, SCC AS 2305, and Remote Party 2306 according to IMS IUT processes. Upon completion of the embodiment shown in FIG. 23, the controller H(e)NB IP Client 2302 and the controlee WTRU 2301 may participate in a collaborative session or the session may have been transferred to the controlee WTRU 2301.

Figure 24:
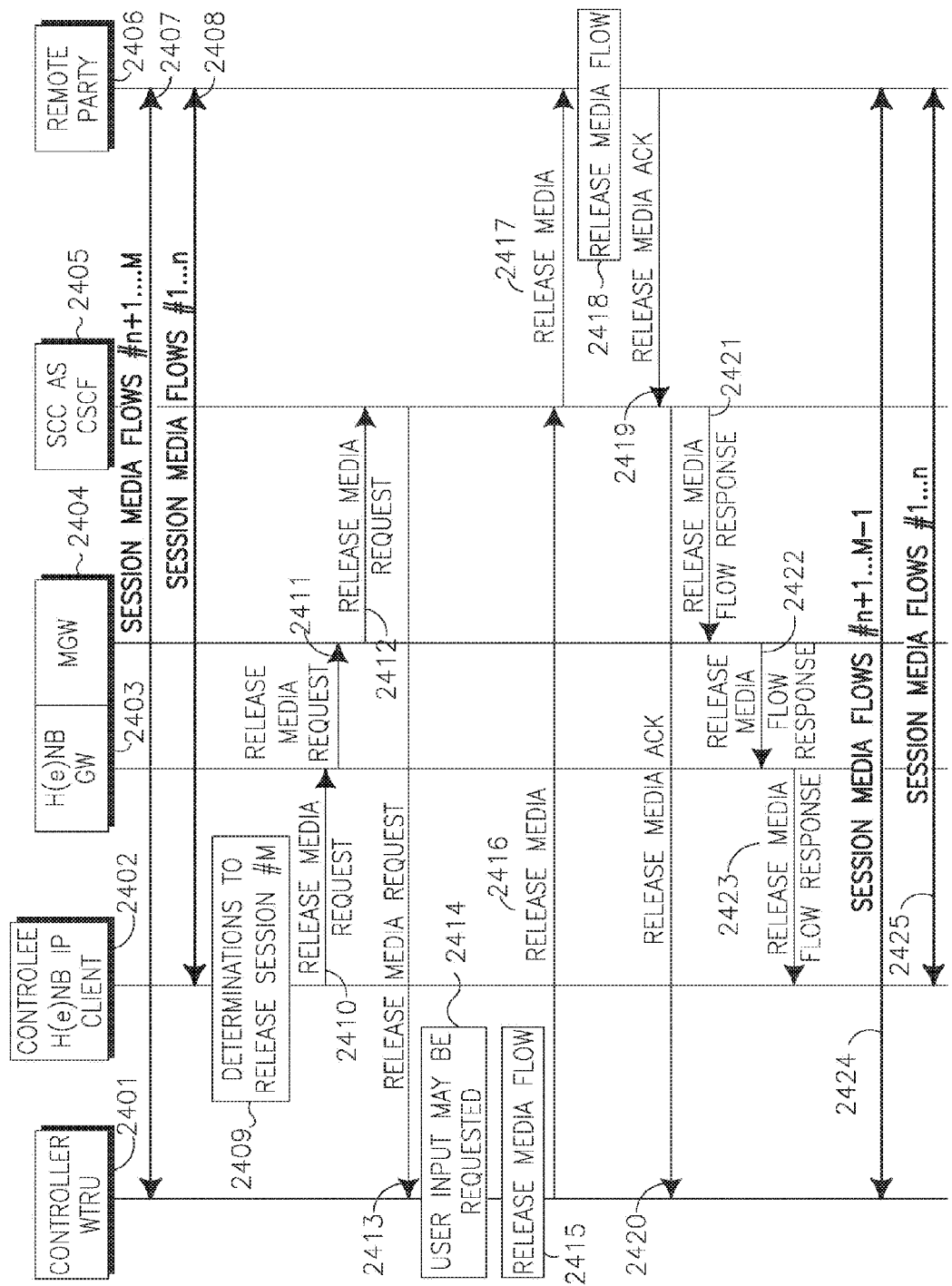
FIG. 24 is a first example of a method of collaborative session release initiated by a controlee H(e)NB IP Client.

FIG. 24 shows an example of a media flow release within a collaborative IMS session between an IMS capable WTRU 2401 and a H(e)NB IP Client 2402, where the SCC AS 2405 is an anchor for the session release initiated by the H(e)NB IP Client 2402 on the IMS capable WTRU 2401. In this example the H(e)NB IP Client 2402 is the controlee and the IMS capable WTRU 2401 is the controller.

Controller WTRU 2401 and Remote Party 2406 may establish one or more media flows (session #n+1 . . . M) in step 2407. Controlee H(e)NB IP Client 2402 and Remote Party 2406 may establish one or more media flows (session #1 . . . n) in step 2408. The controlee H(e)NB IP Client 2402 may determine to release session #M based on predetermined criteria, user profiles, user input, or any other mechanism in step 2409. The controlee H(e)NB IP Client 2402 may send a release media request to the H(e)NB GW 2403 including information about media flow #M in step 2410. The H(e)NB GW 2403 may in turn send a release media request to the MGW 2404 in step 2411. The MGW 2404 may in turn send a release media request to the SCC AS 2405 in step 2412. The SCC AS 2405 may send a release media request to the controller WTRU 2401 in step 2413. The controller WTRU 2401 may request user input such as a confirmation or predetermined factors in step 2414. The controller WTRU 2401 may release media flow in step 2415. The controller WTRU 2401 may send a release media request to the SCC AS 2405 in step 2416. The SCC AS 2405 may in turn send a release media request to the Remote Party 2406 in step 2417. The Remote Party 2406 may release media flow in step 2418. The Remote Party 2406 may send a release media ACK to the SCC AS 2405 in step 2419. The SCC AS 2405 may in turn send a release media ACK to the controller WTRU 2401 in step 2420. The SCC AS 2405 may send a release media flow response to the MGW 2404 in step 2421. The MGW 2404 may in turn send a release media flow response to the H(e)NB GW 2403 in step 2422. The H(e)NB GW 2403 may in turn send a release media flow response to the controlee H(e)NB IP Client 2402 in step 2423. The controller WTRU 2401 may establish media flows (session #n+1 . . . M−1) with the Remote Party 2406 in step 2424. The controlee H(e)NB IP Client 2402 may establish media flows (session #1 . . . n) with the Remote Party 2406 in step 2425.

At any point in the method of FIG. 24, additional actions may be performed between the controller WTRU 2401, controlee H(e)NB IP Client 2402, H(e)NB GW 2403, MGW 2404, SCC AS 2405, and Remote Party 2406 according to IMS IUT processes. Upon completion of the embodiment shown in FIG. 24, the controlee H(e)NB IP Client 2402 and the controller WTRU 2401 may participate in a collaborative session or the session may have been transferred to the controller WTRU 2401.

Figure 25:
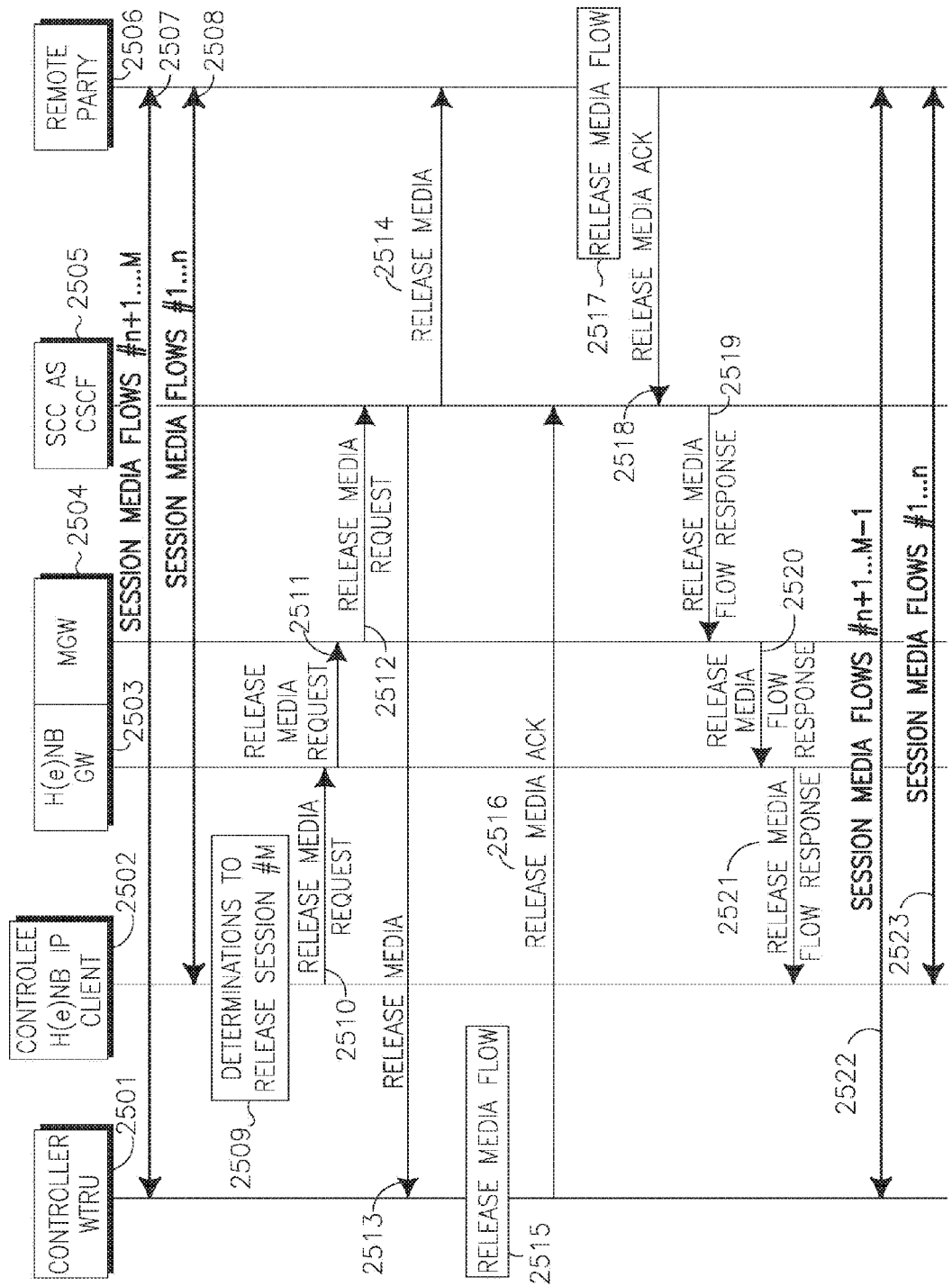
FIG. 25 is a second example of a method of collaborative session release initiated by a controlee H(e)NB IP Client.

FIG. 25 shows a second example of a media flow release within a collaborative IMS session between an IMS capable WTRU 2501 and a H(e)NB IP Client 2502, where the SCC AS 2505 is an anchor for the session release initiated by the H(e)NB IP Client 2502 on the IMS capable WTRU 2501. In this example the H(e)NB IP Client 2502 is the controlee and the IMS capable WTRU 2501 is the controller.

Controller WTRU 2501 and Remote Party 2506 may establish one or more media flows (session #n+1 ... M) in step 2507. Controlee H(e)NB IP Client 2502 and Remote Party 2506 may establish one or more media flows (session #1 ... n) in step 2508. The controlee H(e)NB IP Client 2502 may determine to release session #M based on predetermined criteria, user profiles, user input, or any other mechanism in step 250. The controlee H(e)NB IP Client 2502 may send a release media request to the H(e)NB GW 2503 including information about media flow #M in step 2510. The H(e)NB GW 2503 may in turn send a release media request to the MGW 2504 in step 2511. The MGW 2504 may in turn send a release media request to the SCC AS 2505 in step 2512. The SCC AS 2505 may send a release media request to both the controller WTRU 2501 and the Remote Party 2506 (which can be executed in any order) in steps 2513 and 2514. The controller WTRU 2501 may release media flow in step 2515. The controller WTRU 2501 may send a release media ACK to the SCC AS 2505 in step 2516. The Remote Party 2506 may release media flow in step 2517. The Remote Party 2506 may send a release media ACK to the SCC AS 2505 in step 2518. The SCC AS 2505 may send a release media flow response to the MGW 2504 in step 2519. The MGW 2504 may in turn send a release media flow response to the H(e)NB GW 2503 in step 2520. The H(e)NB GW 2503 may in turn send a release media flow response to the controlee H(e)NB IP Client 2502 instep 2521. The controller WTRU 2501 may establish media flows (session #n+1 ... M−1) with the Remote Party 2506 in step 2522. The controlee H(e)NB IP Client 2502 may establish media flows (session #1 ... n) with the Remote Party 2506 in step 2523.

At any point in the method of FIG. 25, additional actions may be performed between the controller WTRU 2501, controlee H(e)NB IP Client 2502, H(e)NB GW 2503, MGW 2504, SCC AS 2505, and Remote Party 2506 according to IMS IUT processes. Upon completion of the embodiment shown in FIG. 25, the controlee H(e)NB IP Client 2502 and the controller WTRU 2501 may participate in a collaborative session or the session may have been transferred to the controller WTRU 2501.

Figure 26:
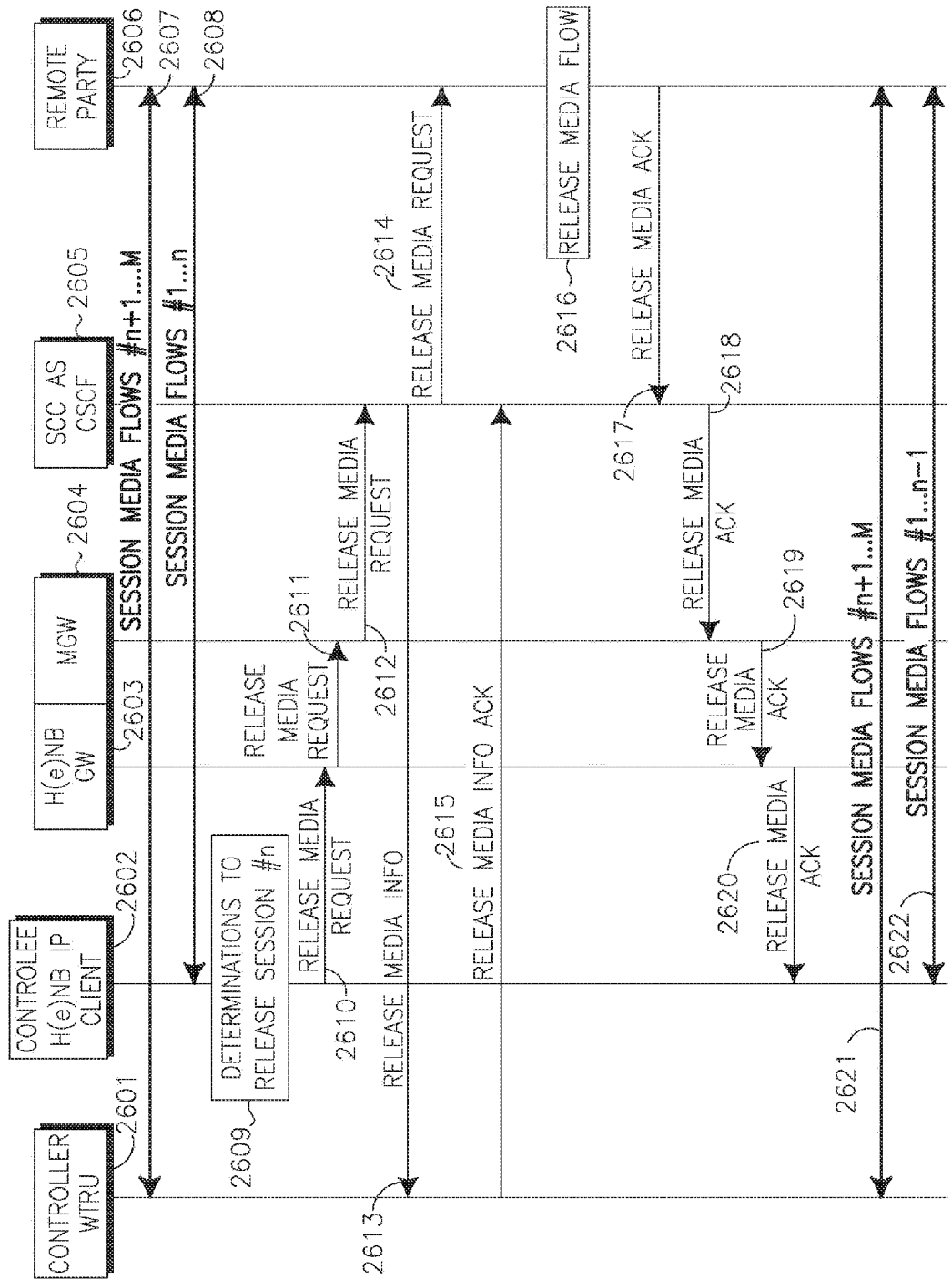
FIG. 26 is a third example of a method of collaborative session release initiated by a controlee H(e)NB IP Client.

FIG. 26 shows an example of a media flow release within a collaborative IMS session between an IMS capable WTRU 2601 and a H(e)NB IP Client 2602, where the SCC AS 2605 is an anchor for the session release initiated by the H(e)NB IP Client 2602 on itself. In this example the H(e)NB IP Client 2602 is the controlee and the IMS capable WTRU 2601 is the controller.

Controller WTRU 2601 and Remote Party 2606 may establish one or more media flows (session #n+1 ... M) in step 2607. Controlee H(e)NB IP Client 2602 and Remote Party 2606 may establish one or more media flows (session #1 ... n) in step 2608. The controlee H(e)NB IP Client 2602 may determine to release session #n based on predetermined criteria, user profiles, user input, or any other mechanism in step 2609. The controlee H(e)NB IP Client 2602 may send a release media request to the H(e)NB GW 2603 including information about media flow #n in step 2610. The H(e)NB GW 2603 may in turn send a release media request to the MGW 2604 in step 2611. The MGW 2604 may in turn send a release media request to the SCC AS 2605 in step 2612. The SCC AS 2065 may send a release media info request to the controller WTRU 2601 in step 2613. The SCC AS 2605 may send a release media request to the Remote Party 2606 in step 2614. The controller WTRU 2601 may send a release media info ACK to the SCC AS 2605 in step 2615. The Remote Party 2606 may release media flow in step 2616. The Remote Party 2606 may send a release media ACK to the SCC AS 2605 in step 2617. The SCC AS 2605 may in turn send a release media ACK to the MGW 2604 in step 2618. The MGW 2604 may in turn send a release media ACK to the H(e)NB GW 2603 in step 2619. The H(e)NB GW 2603 may in turn send a release media ACK to the controlee H(e)NB IP Client 2602 in step 2620. The controller WTRU 2601 may establish media flows (session #n+1 ... M) with the Remote Party 2606 in step 2621. The controlee H(e)NB IP Client 2602 may establish media flows (session #1 ... n−1) with the Remote Party 2606 in step 2622.

At any point in the method of FIG. 26, additional actions may be performed between the controller WTRU 2601, controlee H(e)NB IP Client 2602, H(e)NB GW 2603, MGW 2604, SCC AS 2605, and Remote Party 2606 according to IMS IUT processes. Upon completion of the embodiment shown in FIG. 26, the controlee H(e)NB IP Client 2602 and the controller WTRU 2601 may participate in a collaborative session or the session may have been transferred to the controller WTRU 2601.

EMBODIMENTS

1. A method of Inter-User Equipment (UE) Transfer (IUT) for use in a Home enhanced-Node B (H(e)NB), the method comprising:
   receiving an IUT session transfer command from a Service Centralization and Continuity Application Server (SCC AS) via Internet Protocol (IP) Multimedia Subsystem (IMS) signaling at the H(e)NB.
2. The method as in embodiment 1, further comprising:
   translating the IUT session transfer command to a non-IMS based message at the H(e)NB; and
   transmitting the translated non-IMS based message to an IP Client from the H(e)NB.
3. The method as in embodiment 2 wherein translating the IUT session transfer command is performed by an IMS/IP Bridge.
4. The method as in any one of embodiments 1-3, further comprising:
   receiving a release media request message from an IMS capable wireless transmit/receive unit (WTRU) via the SCC AS.
5. The method as in any one of embodiments 2-4, further comprising:
   transmitting a release media request message to an IMS capable WTRU via the SCC AS.
6. A method of Inter-User Equipment (UE) Transfer (MT) for use in a Home enhanced-Node B (H(e)NB), the method comprising:
   receiving an IUT session transfer command from a first Internet Protocol (IP) Multimedia Subsystem (IMS) capable wireless transmit/receive unit (WTRU) via IMS signaling at the H(e)NB.
7. The method as in embodiment 6, further comprising:
   translating the IUT session transfer command to a non-IMS based message at the H(e)NB; and
   transmitting the translated non-IMS based message to a Service Centralization and Continuity Application Server (SCC AS) from the H(e)NB.
8. The method as in embodiment 7 wherein translating the IUT session transfer command is performed by an IMS/IP Bridge.

9. The method as in any one of embodiments 6-8, further comprising:
receiving a release media request message from the IMS capable WTRU via the SCC AS.
10. The method as in any one of embodiments 7-9, further comprising:
transmitting a release media request message to the IMS capable WTRU via the SCC AS.
11. A method of Inter-User Equipment (UE) Transfer (IUT) for use in an Internet Protocol (IP) Multimedia Subsystem (IMS) capable wireless transmit/receive unit (WTRU), the method comprising:
receiving an IUT session transfer command from a first non-IMS capable WTRU via non-IMS signaling at the IMS capable WTRU.
12. The method as in embodiment 11, further comprising:
translating the IUT session transfer command to a IMS based message at the IMS capable WTRU; and
transmitting the translated IMS based message to a Service Centralization and Continuity Application Server (SCC AS) from the IMS capable WTRU.
13. The method as in any one of embodiments 11-12, further comprising:
receiving an IMS based message from a SCC AS at the IMS capable WTRU.
14. The method as in any one of embodiments 12-13, further comprising:
translating the IMS based message to a non-IMS based message at the IMS capable WTRU.
15. The method as in any one of embodiments 12-14, further comprising: transmitting the translated non-IMS based message to the first non-IMS capable WTRU from the IMS capable WTRU.
16. The method as in any one of embodiments 14-15, wherein the IUT session transfer command is received and the translated non-IMS based message is transmitted via a direct peer-to-peer connection with the first non-IMS capable WTRU.
17. The method as in any one of embodiments 14-15, wherein the IUT session transfer command is received and the translated non-IMS based message is transmitted via a peer-to-peer connection with the first non-IMS capable WTRU through the Internet.
18. The method as in any one of embodiments 11-16, further comprising:
transmitting a release media request message to the non-IMS capable WTRU.
19. The method as in any one of embodiments 11-16, further comprising:
receiving a release media request message from the non-IMS capable WTRU.
20. An apparatus for Inter-User Equipment (UE) Transfer (IUT) for use in a Home enhanced-Node B (H(e)NB), the apparatus comprising:
a receiver configured to receive an IUT session transfer command from a Service Centralization and Continuity Application Server (SCC AS) via Internet Protocol (IP) Multimedia Subsystem (IMS) at the H(e)NB.
21. An apparatus as in embodiment 20, further comprising:
a processor configured to translate the IUT session transfer command to a non-IMS based message at the H(e)NB.
22. An apparatus as in embodiment 22, further comprising:
a transmitter configured to transmit the translated non-IMS based message to an IP Client from the H(e)NB.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:
1. A method of Inter-User Equipment (UE) Transfer (IUT) for use in an Internet Protocol (IP) Multimedia Subsystem (IMS) capable wireless transmit/receive unit (WTRU), the method comprising:
receiving, at the IMS capable WTRU, a registration request from a non-IMS capable WTRU;
translating, at the IMS capable WTRU, the registration request to an IMS based message;
transmitting, from the IMS capable WTRU, the translated IMS based message to a Service Centralization and Continuity Application Server (SCC AS)
transmitting, from the IMS capable WTRU to the SCC AS, an IUT transfer command, wherein the IUT transfer command requests an IUT to transition an IMS session that is initially between the IMS capable WTRU acting as a controller and a remote party to thereafter be between the non-IMS capable WTRU and the remote party;
transmitting, from the IMS capable WTRU to the non-IMS capable WTRU, an IUT process message;
receiving, from the non-IMS capable WTRU, an IUT process-accept message; and
establishing an IMS session between the non-IMS capable WTRU and the remote party.
2. The method of claim 1, the method further comprising establishing, with a non-IMS capable WTRU, a peer-to-peer connection; wherein the registration request is received via the peer-to-peer connection.
3. The method of claim 2, wherein the IUT transfer command is received, and the translated non-IMS based message is transmitted, via the peer-to-peer connection with the non-IMS capable WTRU.
4. The method of claim 2, wherein the IUT transfer command is received, and the translated non-IMS based message is transmitted, via a second peer-to-peer connection with the non-IMS capable WTRU through the Internet.
5. The method of claim 1, the method further comprising transmitting a release media request message to the non-IMS capable WTRU.
6. The method of claim 1, the method further comprising receiving a release media request from the non-IMS capable WTRU.
7. The method of claim 1, the method further comprising establishing, via an IUT transfer process, a collaborative media session with the IMS-capable and non-IMS-capable WTRUs.

8. The method of claim 1, wherein the IUT transfer command comprises a flow identification and information regarding the non-IMS capable WTRU and the SCC AS manages an access leg and a remote leg for the IMS-capable WTRU.

9. The method of claim 1, wherein an initial IMS session comprises one or more media flows between the IMS capable WTRU and a remote WTRU, the method further comprising:
the IMS capable WTRU acting as a proxy for the non-IMS capable WTRU; and
transferring, via an IUT transfer process, at least one of the media flows from being between the IMS capable WTRU and the remote WTRU to thereafter being between the non-IMS capable WTRU and the remote WTRU.

10. An Internet Protocol (IP) Multimedia Subsystem (IMS) capable wireless transmit/receive unit (WTRU) comprising a receiver, a transmitter, a processor, and non-transitory computer-readable medium storing instructions operative when executed on the processor to perform a set of functions, the set of functions including:
receiving, at the IMS capable WTRU, a registration request from a non-IMS capable WTRU;
translating, at the IMS capable WTRU, the registration request to an IMS based message;
transmitting, from the IMS capable WTRU, the translated IMS based message to a Service Centralization and Continuity Application Server (SCC AS)
transmitting, from the IMS capable WTRU to the SCC AS, an Inter-User Equipment (UE) Transfer (IUT) transfer command, wherein the IUT transfer command requests an IUT to transition an IMS session that is initially between the IMS capable WTRU acting as a controller and a remote party to thereafter be between the non-IMS capable WTRU and the remote party;
transmitting, from the IMS capable WTRU to the non-IMS capable WTRU, an IUT process message;
receiving, from the non-IMS capable WTRU, an IUT process-accept message; and
establishing an IMS session between the non-IMS capable WTRU and the remote party.

11. The IMS capable WTRU of claim 10, the set of functions further comprising:
establishing, with a non-IMS capable WTRU, a peer-to-peer connection; wherein the registration request is received via the peer-to-peer connection.

12. The IMS capable WTRU of claim 11, wherein the IUT transfer command is received, and the translated non-IMS based message is transmitted, via the direct peer-to-peer connection with the non-IMS capable WTRU.

13. The IMS capable WTRU of claim 11, wherein the IUT transfer command is received, and the translated non-IMS based message is transmitted, via a second peer-to-peer connection with the non-IMS capable WTRU through the Internet.

14. The IMS capable WTRU of claim 10, the set of functions further comprising transmitting a release media request message to the non-IMS capable WTRU.

15. The IMS capable WTRU of claim 10, the set of functions further comprising receiving a release media request from the non-IMS capable WTRU.

16. The IMS capable WTRU of claim 10, the set of functions further comprising establishing, via an IUT transfer process, a collaborative media session with the IMS-capable and non-IMS-capable WTRUs.

17. The IMS capable WTRU of claim 10, wherein the IUT transfer command comprises a flow identification and information regarding the non-IMS capable WTRU and the SCC AS manages an access leg and a remote leg for the IMS-capable WTRU.

18. The IMS capable WTRU of claim 10, wherein an initial IMS session comprises one or more media flows between the IMS capable WTRU and a remote WTRU, the method further comprising:
the IMS capable WTRU acting as a proxy for the non-IMS capable WTRU; and
transferring, via an IUT transfer process, at least one of the media flows from being between the IMS capable WTRU and the remote WTRU to thereafter being between the non-IMS capable WTRU and the remote WTRU.

* * * * *